United States Patent
Kakuno et al.

(10) Patent No.: US 9,257,918 B2
(45) Date of Patent: Feb. 9, 2016

(54) VEHICLE WINDOW OPENING AND CLOSING CONTROL DEVICE

(71) Applicants: Hideyo Kakuno, Aichi (JP); Katsunori Kigoshi, Aichi (JP)

(72) Inventors: Hideyo Kakuno, Aichi (JP); Katsunori Kigoshi, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 182 days.

(21) Appl. No.: 14/024,173

(22) Filed: Sep. 11, 2013

(65) Prior Publication Data

US 2014/0070733 A1  Mar. 13, 2014

(30) Foreign Application Priority Data

Sep. 12, 2012 (JP) ................. 2012-200244

(51) Int. Cl.
| | |
|---|---|
| *H02P 1/04* | (2006.01) |
| *H02P 7/00* | (2006.01) |
| *H02P 1/22* | (2006.01) |
| *E05F 15/695* | (2015.01) |

(52) U.S. Cl.
CPC ............... *H02P 1/22* (2013.01); *E05F 15/695* (2015.01); *H02P 7/0094* (2013.01)

(58) Field of Classification Search
CPC ....................................................... H02P 7/00
USPC ......... 318/468, 483, 264, 265, 266, 267, 467, 318/280–284
See application file for complete search history.

(56) References Cited

U.S. PATENT DOCUMENTS

| | | | | |
|---|---|---|---|---|
| 5,734,245 | A * | 3/1998 | Terashima et al. | 318/453 |
| 5,977,732 | A | 11/1999 | Matsumoto | |
| 6,278,250 | B1 * | 8/2001 | Sasaki | 318/283 |
| 7,061,196 | B2 | 6/2006 | Noro et al. | |
| 8,710,773 | B2 * | 4/2014 | Kigoshi et al. | 318/280 |
| 2001/0024063 | A1 * | 9/2001 | Sasaki | 307/10.1 |
| 2012/0091793 | A1 | 4/2012 | Kigoshi et al. | |

FOREIGN PATENT DOCUMENTS

| | | |
|---|---|---|
| JP | 06343279 A | 12/1994 |
| JP | H11-336422 A | 12/1999 |

(Continued)

OTHER PUBLICATIONS

Japanese Office Action for Application No. 2012-200244, mailed on Aug. 6, 2014 (12 pages).

(Continued)

*Primary Examiner* — Eduardo Colon Santana
*Assistant Examiner* — Bickey Dhakal
(74) *Attorney, Agent, or Firm* — Osha Liang LLP

(57) ABSTRACT

A vehicle window opening and closing control device has a driver seat unit that is provided in a driver seat of a vehicle, and a sub-switch that is provided in a seat other than the driver seat. The driver seat unit includes a main switch that operates opening and closing of a first window of the driver seat and a second window of the seat other than the driver seat and a controller that controls a driver seat motor provided in the driver seat and an other-seat motor provided in the seat other than the driver seat to perform manual opening and closing and automatic opening and closing of the first and second windows based on the operation of the main switch. The sub-switch is a switch that performs only the manual opening and closing of the second window using the other-seat motor.

16 Claims, 18 Drawing Sheets

(56) References Cited

FOREIGN PATENT DOCUMENTS

| | | |
|---|---|---|
| JP | 2005-146766 A | 6/2005 |
| JP | 2005-213832 A | 8/2005 |
| JP | 2008019625 A | 1/2008 |
| JP | 2009108493 A | 5/2009 |
| JP | 2012082647 A | 4/2012 |

OTHER PUBLICATIONS

Notification of Reasons for Refusal issued in corresponding Japanese Application No. 2012-200244, mailed on Mar. 3, 2015 (12 pages).

* cited by examiner

VEHICLE WINDOW OPENING AND CLOSING CONTROL DEVICE

BACKGROUND OF THE INVENTION

1. Technical Field

The present invention relates to a control device that opens and closes a vehicle window, particularly to a window opening and closing control device that can open and close all windows of seats by a switch operation at a driver seat.

2. Related Art

In a power window device that opens and closes a window of a vehicle using an electric motor, the motor is rotated in a normal rotation direction or a reverse rotation direction to open and close the window according to an operation situation of an operation switch. For example, the motor is driven in the normal rotation direction to close the window when the operation switch is operated onto an UP side (a window closing side), and the motor is driven in the reverse rotation direction to open the window when the operation switch is operated onto a DOWN side (a window opening side). Based on a signal from the operation switch, the normal rotation and the reverse rotation of the motor are controlled by switching a direction of a current passed through the motor in a motor driving circuit.

Generally, in an automobile, the operation switches are provided in each of a driver seat and other seats (such as a passenger seat, a left rear seat, and a right rear seat) other than the driver seat. The operation switch provided in the driver seat (a main switch) includes other seat switches that remotely control the opening and closing of the windows of the other seats such as the passenger seat in addition to a driver seat switch that operates the opening and closing of the window of the driver seat. The operation switch provided in each of other seats (a sub-switch) operates only the opening and closing of the window of the seat. A controller is provided in order to control the opening and closing of the window based on the operation of the main switch or the sub-switch. The vehicle window opening and closing control device is also equipped with a function of detecting a foreign substance caught in the window to stop window closing action or to invert the window closing action to window opening action.

Japanese Unexamined Patent Publication No. 2008-19625 discloses a window opening and closing control device, in which the controller is provided in each of the main switch of the driver seat and the sub-switches of the other seats and each controller manually or automatically drives the motor according to the switch operation of each seat. In the window opening and closing control device, the controllers of the seats are connected to one another by a serial communication line. In the case that the window opening and closing operation of each of the other seats is performed using the main switch of the driver seat, the controller of the driver seat conducts communication with the controller of the corresponding seat through the serial communication line, and the controller of the corresponding seat drives and controls the motor. Although the detection of the catch is not described in Japanese Unexamined Patent Publication No. 2008-19625, a sensor that detects a position of the window is disposed in each seat, and the controller of each seat possibly receives an output of the sensor to detect the catch.

Japanese Unexamined Patent Publication No. 6-343279 discloses a window opening and closing control device in which one controller receives the output from the main switch of the driver seat or the sub-switch of each of other seats to control a window driving motor of each seat. In the window opening and closing control device, the catch is detected based on a detection result (a current value) of the current passed through the motor and a detection result of the window position by an encoder.

Japanese Unexamined Patent Publication No. 2009-108493 discloses a window opening and closing control device in which a ripple of the current passed through the motor is detected and the number of rotations of the motor is calculated based on the detection result to control the opening and closing of the window. In the window opening and closing control device, the current passed through motor is monitored during the window closing action, a determination that the catch is generated is made when the current value exceeds a predetermined threshold, and the motor is rotated in a reverse direction to open the window.

Japanese Unexamined Patent Publication No. 2012-82647 discloses a window opening and closing control device in which a control unit (a driver seat unit) on the driver seat side and a control unit (other-seat unit) on the other-seat side are connected to each other by a single signal line. In the window opening and closing control device, when the window opening and closing operation is performed by the driver seat unit, the direction of the current passed through the motor is switched using contacts of a window closing switch and a window opening switch of the other-seat unit. The detection of the catch is not described in Japanese Unexamined Patent Publication No. 2012-82647.

One or more embodiments of the present invention constructs a window opening and closing control device, which has a simple configuration in which the number of wirings between a driver seat and a seat other than the driver seat is decreased, can perform manual action and automatic action of windows of all the seats from the driver seat unit, and can detect the catch in the windows of all the seats by the driver seat unit.

SUMMARY

In accordance with one or more embodiments of the present invention, a vehicle window opening and closing control device includes: a driver seat unit that is provided in a driver seat of a vehicle; and a sub-switch that is provided in a seat other than the driver seat, wherein the driver seat unit includes a main switch that operates opening and closing of a window of the driver seat and a window of the seat other than the driver seat and a controller that controls a driver seat motor provided in the driver seat and an other-seat motor provided in the seat other than the driver seat to perform manual opening and closing and automatic opening and closing of the windows of the driver seat and the seat other than the driver seat based on the operation of the main switch, the sub-switch is a switch that performs only the manual opening and closing of the window of the seat other than the driver seat using the other-seat motor, the driver seat unit and the driver seat motor are connected to each other by first and second wirings, and a direction of a current passed through the driver seat motor and the first and second wirings switches according to the opening and closing operation of the window of the driver seat using the main switch, the driver seat unit and the other-seat motor of the seat other than the driver seat are connected to each other by third and fourth wirings through the sub-switch of the seat other than the driver seat, and a direction of a current passed through the other-seat motor, the third and fourth wirings, and the sub-switch switches according to the opening and closing operation of the window of the seat other than the driver seat using the main switch, and the controller monitors the currents passed through the first to fourth wirings, and detects generation of catch in the window of the driver seat and the window of the seat other than the driver seat based on states of the currents.

According to one or more embodiments of the present invention, the driver seat unit and the driver seat motor are connected to each other by the two wiring, the driver seat unit and the other-seat motor are connected to each other by the two wiring, and the direction of the current passed through each wiring is switched, which allows a rotating direction of each motor to be controlled. Therefore, the automatic opening and closing action and the manual opening and closing action of the windows of all the seats can be performed in the driver seat unit by the simple configuration in which the number of wirings is decreased. Additionally, the current of the motor of each seat is monitored with the controller provided in the driver seat unit, which allows the generation of the catch to be detected in the windows of all the seats. It is not necessary to provide a sensor that detects the generation of the catch, and it is not necessary to provide the controller in each seat. Therefore, the circuit configuration can be simplified.

In one or more embodiments of the present invention, the sub-switch includes a first contact and a second contact. The first contact is normally connected to the driver seat unit by the third wiring, and switches when the window closing operation is performed using the sub-switch. The second contact is normally connected to the driver seat unit by the fourth wiring, and switches when the window opening operation is performed using the sub-switch. The switched first contact and the switched second contact are connected to a power supply by wirings other than the third and fourth wirings.

In one or more embodiments of the present invention, the controller detects a ripple generated in each of the currents passed through the first to fourth wirings, and determines an opening and closing positions of the windows of the driver seat and the seat other than the driver seat from the states of the ripples.

In one or more embodiments of the present invention, when the opening and closing operation of the window of the seat other than the driver seat is performed using the main switch while the opening and closing operation of the window of the seat other than the driver seat is also performed using the sub-switch, and when the window opening and closing operations are performed in an identical direction using the main switch and the sub-switch, the controller rotates the other-seat motor such that the window is opened or closed in the direction.

In one or more embodiments of the present invention, when the opening and closing operation of the window of the seat other than the driver seat is performed using the main switch while the opening and closing operation of the window of the seat other than the driver seat is also performed using the sub-switch, and when the window opening and closing operations are performed in opposite directions to each other using the main switch and the sub-switch, the controller stops the other-seat motor.

In one or more embodiments of the present invention, when the manual opening operation of the window of the seat other than the driver seat is performed using the main switch while the manual closing operation of the window of the seat other than the driver seat is performed using the sub-switch, or when the manual closing operation of the window of the seat other than the driver seat is performed using the main switch while the manual opening operation of the window of the seat other than the driver seat is performed using the sub-switch, the controller stops the other-seat motor while both the main switch and the sub-switch are operated, and the controller rotates the other-seat motor according to the operation of one of the switches when the operation of other switch is stopped.

In one or more embodiments of the present invention, when the automatic opening operation of the window of the seat other than the driver seat is performed using the main switch while the manual closing operation of the window of the seat other than the driver seat is performed using the sub-switch, or when the automatic closing operation of the window of the seat other than the driver seat is performed using the main switch while the manual opening operation of the window of the seat other than the driver seat is performed using the sub-switch, the controller determines that the catch is generated in the window of the seat other than the driver seat by the stop of the other-seat motor, and the controller stops automatic opening action or automatic closing action of the window of the seat other than the driver seat.

In one or more embodiments of the present invention, the controller performs manual opening action or manual closing action of the window of the seat other than the driver seat according to the operation of the sub-switch after stopping the automatic opening action or the automatic closing action of the window of the seat other than the driver seat.

In one or more embodiments of the present invention, the sub-switch and the other-seat motor are provided in respective seats.

Accordingly, one or more embodiments of the present invention can provide the window opening and closing control device, which has the simple configuration in which the number of wirings between the driver seat and the seat other than the driver seat is decreased, can perform the manual action and the automatic action of the windows of all the seats from the driver seat unit, and can detect the catch in the windows of all the seats by the driver seat unit.

DETAILED DESCRIPTION

Figure 1:
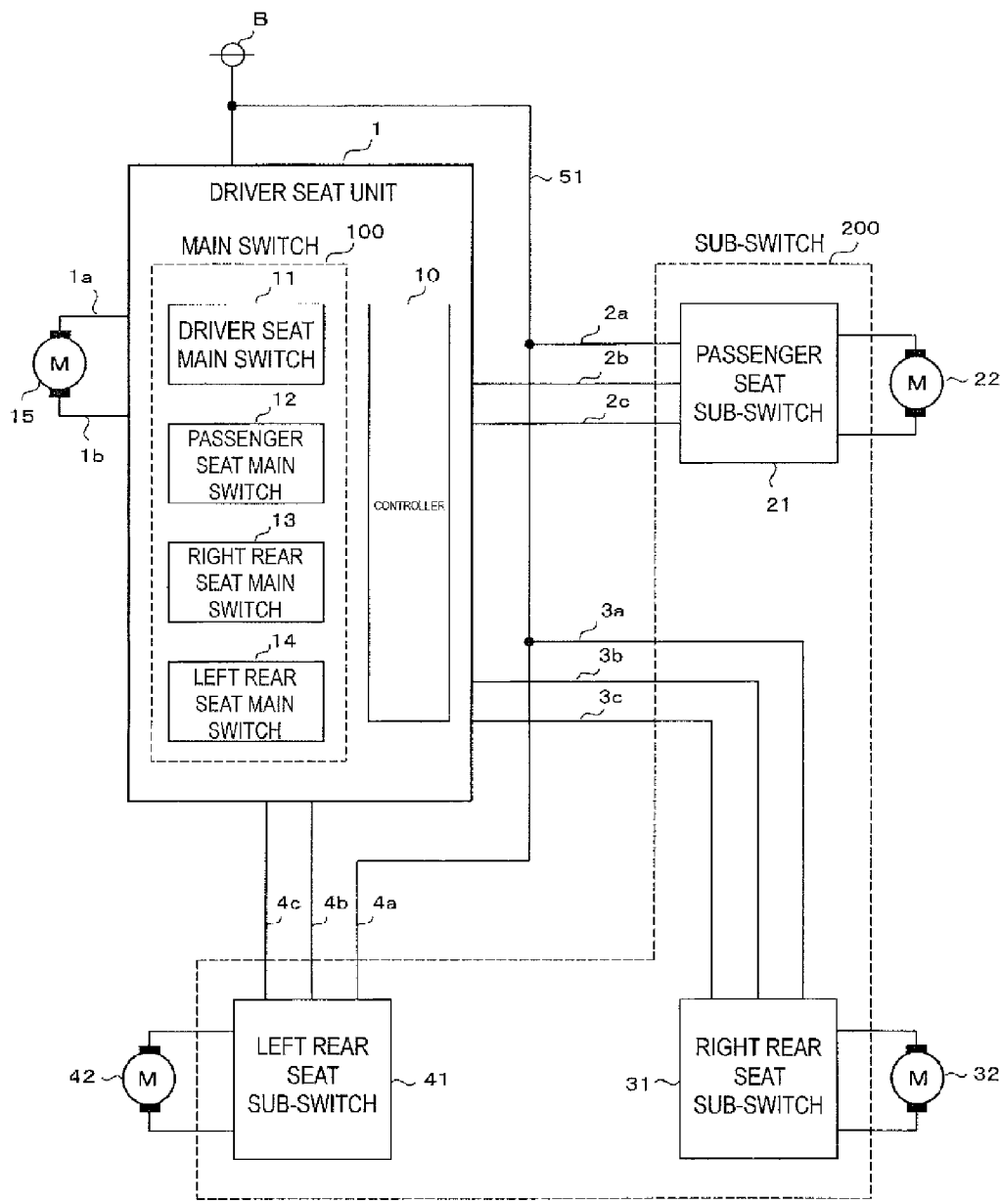
FIG. 1 is a schematic configuration diagram illustrating a vehicle window opening and closing control device according to one or more embodiments of the present invention.

Hereinafter, embodiments of the present invention will be described with reference to the drawings. In the drawings, the identical or equivalent component is designated by the identical numeral. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

A schematic configuration of a vehicle window opening and closing control device (hereinafter simply referred to as a "window opening and closing control device") will be described with reference to FIG. 1. Referring to FIG. 1, a driver seat unit 1 and a sub-switch 200 constitute the window opening and closing control device.

The driver seat unit 1 is provided in a driver seat of a vehicle, and includes a main switch 100 and a controller 10. The main switch 100 performs opening and closing operations to a window of the driver seat and windows of seats except the driver seat, and the main switch 100 includes four switches 11 to 14. The driver seat main switch 11 performs the opening and closing operations to the window of the driver seat. The passenger seat main switch 12 performs the opening and closing operations to the window of a passenger seat. The right rear seat main switch 13 performs the opening and closing operations to the window of a right rear seat. The left rear seat main switch 14 performs the opening and closing operations to the window of a left rear seat.

Based on the operations of the switches 11 to 14, the controller 10 controls a driver seat motor 15 provided in the driver seat and other-seat motors 22, 32, and 42 provided in other seats, and opens and closes the windows of the driver seat and other seats. The motor 22 is a passenger seat motor provided in the passenger seat, the motor 32 is a right rear seat motor provided in a right rear seat, and the motor 42 is a left rear seat motor provided in a left rear seat.

The sub-switch 200 includes a passenger seat sub-switch 21 provided in the passenger seat, a right rear seat sub-switch 31 provided in the right rear seat, and a left rear seat sub-switch 41 provided in the left rear seat. The passenger seat sub-switch 21 is provided between the driver seat unit 1 and the motor 22, the right rear seat sub-switch 31 is provided between the driver seat unit 1 and the motor 32, and the left rear seat sub-switch 41 is provided between the driver seat unit 1 and the motor 42.

The driver seat unit 1 and the driver seat motor 15 are connected to each other by a wiring 1a and a wiring 1b. The driver seat unit 1 and the passenger seat sub-switch 21 are connected to each other by a wiring 2b and a wiring 2c. The driver seat unit 1 and the right rear seat sub-switch 31 are connected to each other by a wiring 3b and a wiring 3c. The driver seat unit 1 and the left rear seat sub-switch 41 are connected to each other by a wiring 4b and a wiring 4c. The wiring 1a constitutes the first wiring according to one or more embodiments of the present invention, and the wiring 1b constitutes the second wiring according to one or more embodiments of the present invention. The wirings 2b, 3b, and 4b constitute the third wiring according to one or more embodiments of the present invention, and the wirings 2c, 3c, and 4c constitute the fourth wiring according to one or more embodiments of the present invention.

A power supply B supplies a predetermined voltage (for example, DC 12 V) to the driver seat unit 1. A common power-supply line 51 is connected to the power supply B, the passenger seat sub-switch 21 is connected to the common power-supply line 51 by a wiring 2a, the right rear seat sub-switch 31 is connected to the common power-supply line 51 by a wiring 3a, and the left rear seat sub-switch 41 is connected to the common power-supply line 51 by a wiring 4a.

Specific configurations of the driver seat unit 1 and the sub-switch 200 will be described below with reference to FIG. 2.

In the driver seat unit 1, the driver seat main switch 11, the passenger seat main switch 12, the right rear seat main switch 13, and the left rear seat main switch 14 are connected to the controller 10.

In the main switch 100, the driver seat main switch 11 includes a manual contact 11M that switches in a manual operation and an automatic contact 11A that is turned on in an automatic operation. The manual contact 11M switches onto an UP side (a window closing side) in performing the manual operation to close the window, and switches onto a DOWN side (a window opening side) in performing the manual operation to open the window. The automatic contact 11A is turned on when the operation of the switch 11 is still continued (the case that the driver seat main switch 11 makes a transition to the automatic operation) from the state in which the manual contact 11M switches onto the UP side or the DOWN side.

When the automatic contact 11A is turned on after the manual contact 11M switches onto the UP side, even if the operation of the switch 11 is released to turn off the manual contact 11M and the automatic contact 11A, automatic closing action is continued by the controller 10, and the window moves to a fully-closed position. When the automatic contact 11A is turned on after the manual contact 11M switches onto the DOWN side, even if the operation of the switch 11 is released to turn off the manual contact 11M and the automatic contact 11A, automatic opening action is continued by the controller 10, and the window moves to a fully-opened position.

The passenger seat main switch 12 includes a manual contact 12M that switches in the manual operation and an automatic contact 12A that is turned on in the automatic operation. The right rear seat main switch 13 includes a manual contact 13M that switches in the manual operation and an automatic contact 13A that is turned on in the automatic operation. The left rear seat main switch 14 includes a manual contact 14M that switches in the manual operation and an automatic contact 14A that is turned on in the automatic operation. Because the action of the driver seat main switch 11 are true of the passenger seat main switch 12, the right rear seat main switch 13, and the left rear seat main switch 14, the detailed description of the switches 12 to 14 are omitted.

The controller 10 is constructed by a CPU, and includes a catch detector 10a. The controller 10 also includes a switching circuit (not illustrated) that switches the wirings 1a, 1b, 2b, 2c, 3b, 3c, 4b, and 4c to the power supply B or a ground G in response to an instruction of the CPU.

In the sub-switch 200, the passenger seat sub-switch 21 includes two contacts 211 and 212. The contact 211 constitutes the first contact according to one or more embodiments of the present invention, and the contact 212 constitutes the second contact according to one or more embodiments of the present invention. The contact 211 is normally connected to the driver seat unit 1 by the wiring 2b, and switches onto the UP side (the window closing side) when the operation to close the window is performed by the passenger seat sub-switch 21. The contact 212 is normally connected to the driver seat unit 1 by the wiring 2c, and switches onto the DOWN side (the window opening side) when the operation to open the window is performed by the passenger seat sub-switch 21. The contact 211 that switches onto the UP side and the contact 212 that switches onto the DOWN side are connected to the power supply B through the common power-supply line 51 by the wiring 2a different from the wirings 2b and 2c.

For example, each of the contact 211 and 212 of the sub-switch 21 includes a rubber contact. In each of the contact 211 and 212, a fixed-side contact is formed on a wiring board, and a movable-side contact is provided in an actuator (not illustrated) of the sub-switch 21. The movable-side contact comes into contact with and separates from the fixed-side contact by the operation of the actuator, thereby switching the contact.

Because the action of the passenger seat sub-switch 21 is true of the right rear seat sub-switch 31 and the left rear seat sub-switch 41, the detailed description of the switches 31 and 41 is omitted.

Figure 2:
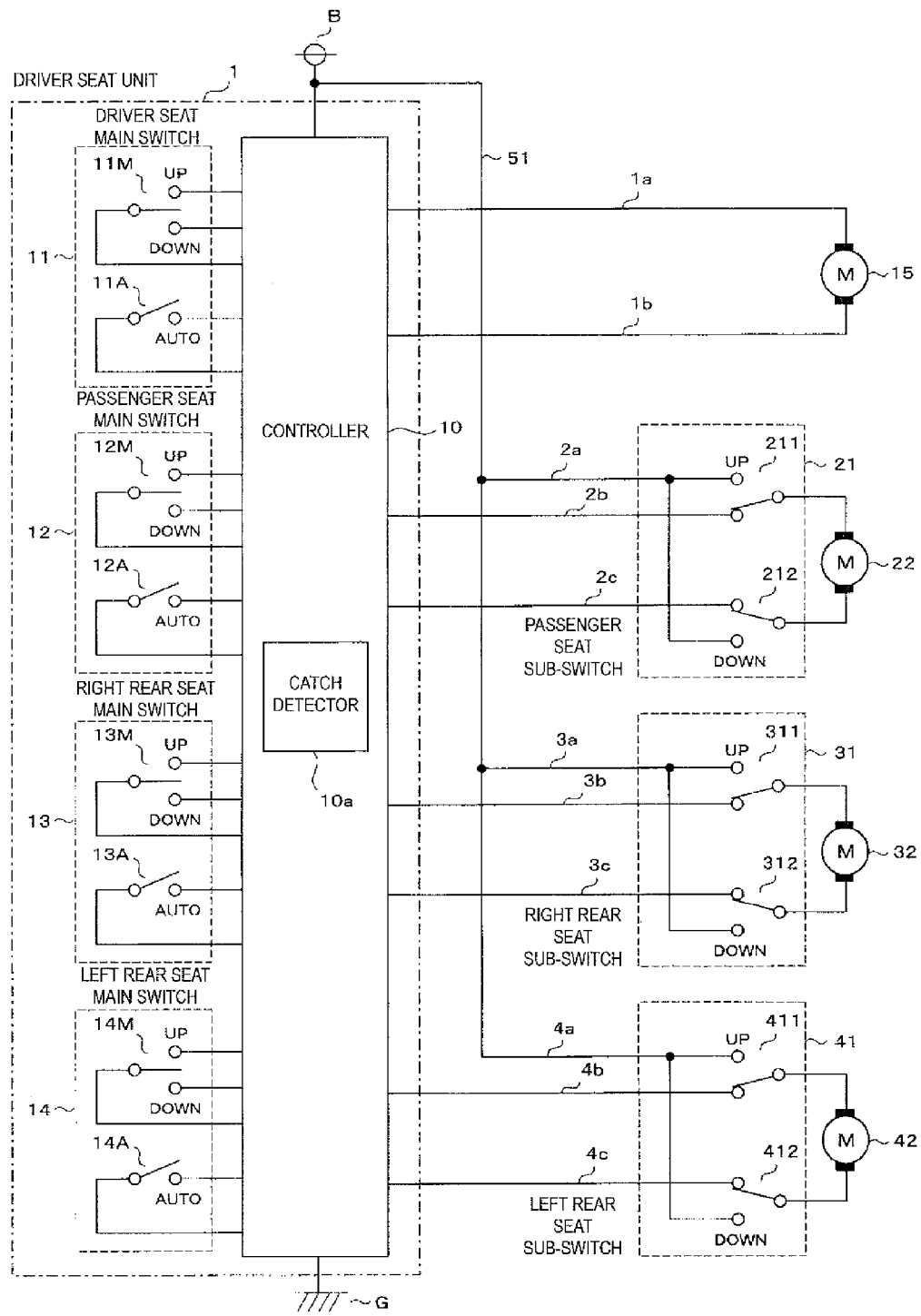
FIG. 2 is a specific circuit diagram of the window opening and closing control device.

In the window opening and closing control device having the above configuration, the circuit is in the state in FIG. 2 when both the main switch 100 and the sub-switch 200 are not operated. The motors 15, 22, 32, and 42 stop in the state in FIG. 2 because the power supply B does not supply an electric power to the motors.

The action in the case that the main switch 100 or the sub-switch 200 is operated will be described below. Hereinafter, the operation to manually close the window is referred to as a "manual UP operation", the operation to manually open the window is referred to as a "manual DOWN operation", the operation to automatically close the window is referred to as an "automatic UP operation", and the operation to automatically open the window is referred to as an "automatic DOWN operation".

(1) The Case that Only the Main Switch is Operated

Figure 3:
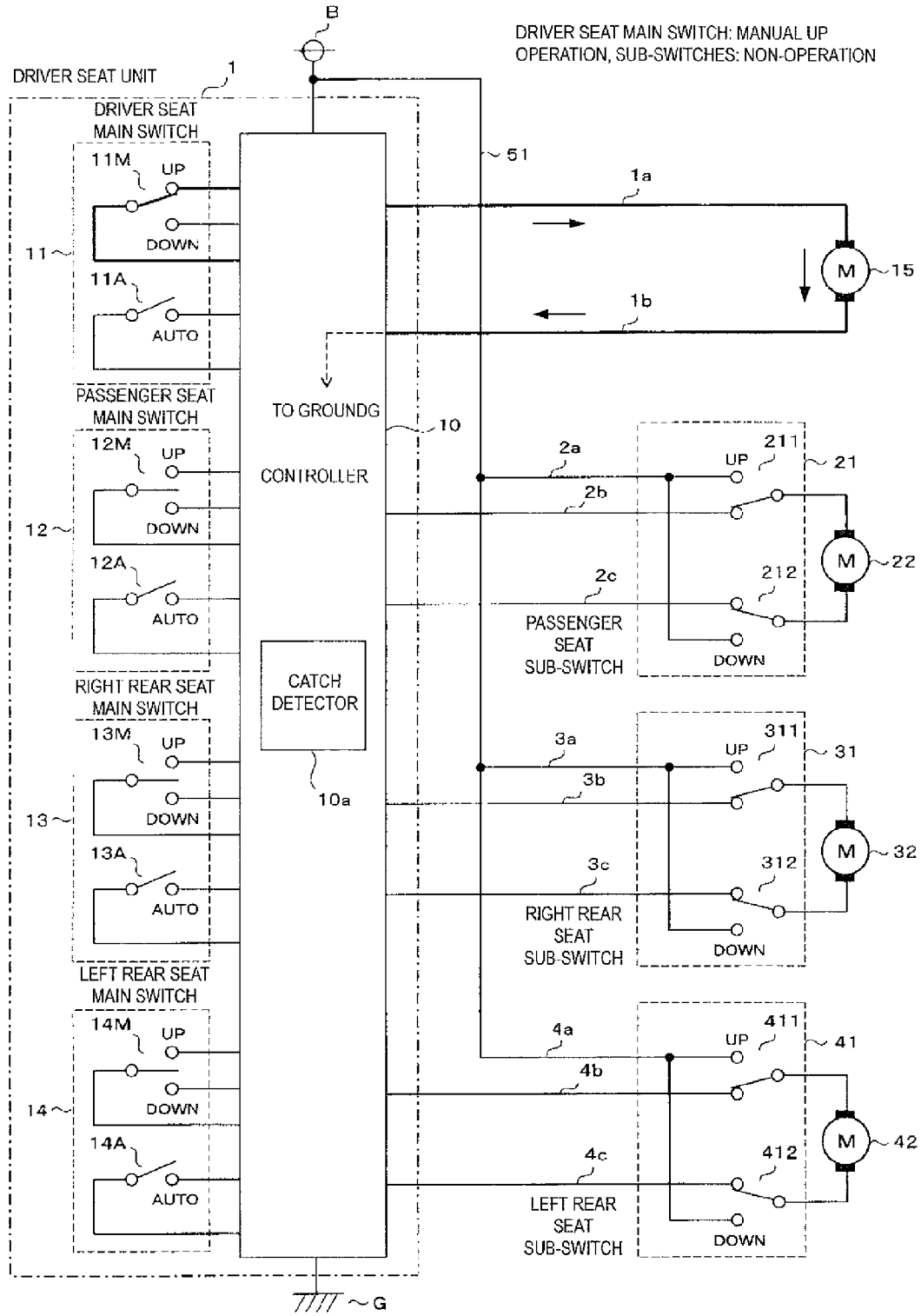
FIG. 3 is a view illustrating a circuit state in the case that a driver seat main switch performs a manual UP operation while sub-switches are not operated.

FIG. 3 illustrates a circuit state in the case that the driver seat main switch 11 of the driver seat performs the manual UP operation while the sub-switches 21, 31, and 41 of other seats are not operated. In the state in FIG. 3, the manual contact 11M of the driver seat main switch 11 switches onto the UP side (the window closing side). Based on a signal input from the driver seat main switch 11, the controller 10 connects the wiring 1a to the power supply B, and connects the wiring 1b to the ground G. Therefore, a current is passed through the wiring 1a, the driver seat motor 15, and the wiring 1b in an arrow direction, and the motor 15 rotates normally. As a result, the window of the driver seat performs the closing action while the driver seat main switch 11 performs the manual UP operation. When the manual UP operation of the driver seat main switch 11 is released, the current is not passed through the driver seat motor 15, the motor 15 stops, and the closing action of the window of the driver seat also stops.

Figure 4:
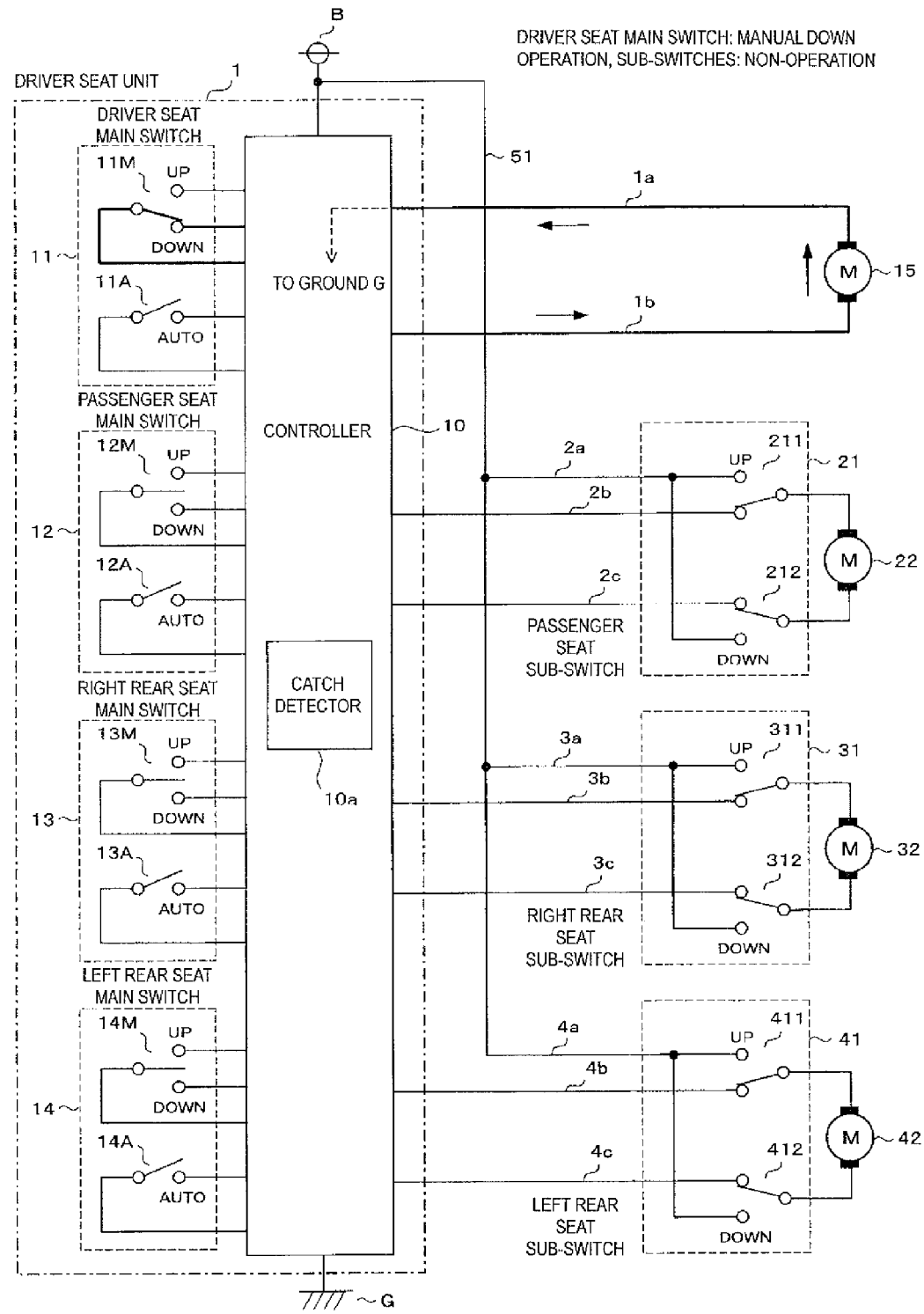
FIG. 4 is a view illustrating a circuit state in the case that the driver seat main switch performs a manual DOWN operation while the sub-switches are not operated.

FIG. 4 illustrates a circuit state in the case that the driver seat main switch 11 of the driver seat performs the manual DOWN operation while the sub-switches 21, 31, and 41 of other seats are not operated. In the state in FIG. 4, the manual contact 11M of the driver seat main switch 11 switches onto the DOWN side (the window opening side). Based on the signal input from the driver seat main switch 11, the controller 10 connects the wiring 1b to the power supply B, and connects the wiring 1a to the ground G. Therefore, the current is passed through the wiring 1b, the driver seat motor 15, and the wiring 1a in the arrow direction (the opposite direction to that of FIG. 3), and the motor 15 rotates reversely. As a result, the window of the driver seat performs the opening action while the driver seat main switch 11 performs the manual DOWN operation. When the manual DOWN operation of the driver seat main switch 11 is released, the current is not passed through the driver seat motor 15, the motor 15 stops, and the opening action of the window of the driver seat also stops.

Figure 5:
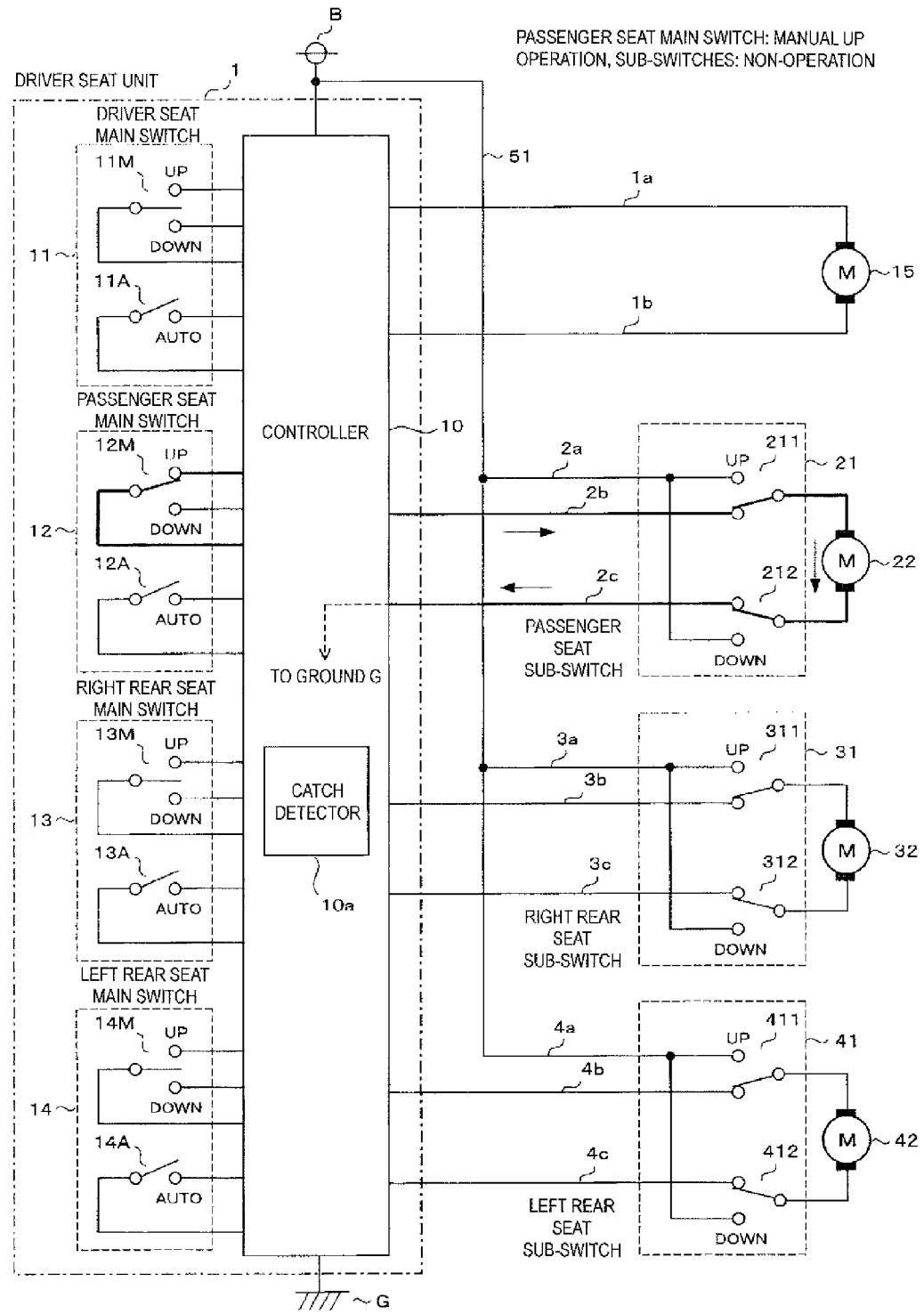
FIG. 5 is a view illustrating a circuit state in the case that a passenger seat main switch performs the manual UP operation while the sub-switches are not operated.

FIG. 5 illustrates a circuit state in the case that the passenger seat main switch 12 of the driver seat performs the manual UP operation while the sub-switches 21, 31, and 41 of other seats are not operated. In the state in FIG. 5, the manual contact 12M of the passenger seat main switch 12 switches onto the UP side (the window closing side). Based on the signal input from the passenger seat main switch 12, the controller 10 connects the wiring 2b to the power supply B, and connects the wiring 2c to the ground G. Therefore, the current is passed through the wiring 2b, the passenger seat motor 22, and the wiring 2c in the arrow direction, and the motor 22 rotates normally. As a result, the window of the passenger seat performs the closing action while the passenger seat main switch 12 performs the manual UP operation. When the manual UP operation of the passenger seat main switch 12 is released, the current is not passed through the passenger seat motor 22, the motor 22 stops, and the closing action of the window of the passenger seat also stops. Thus, the closing action of the window of the passenger seat can be performed from the driver seat.

Figure 6:
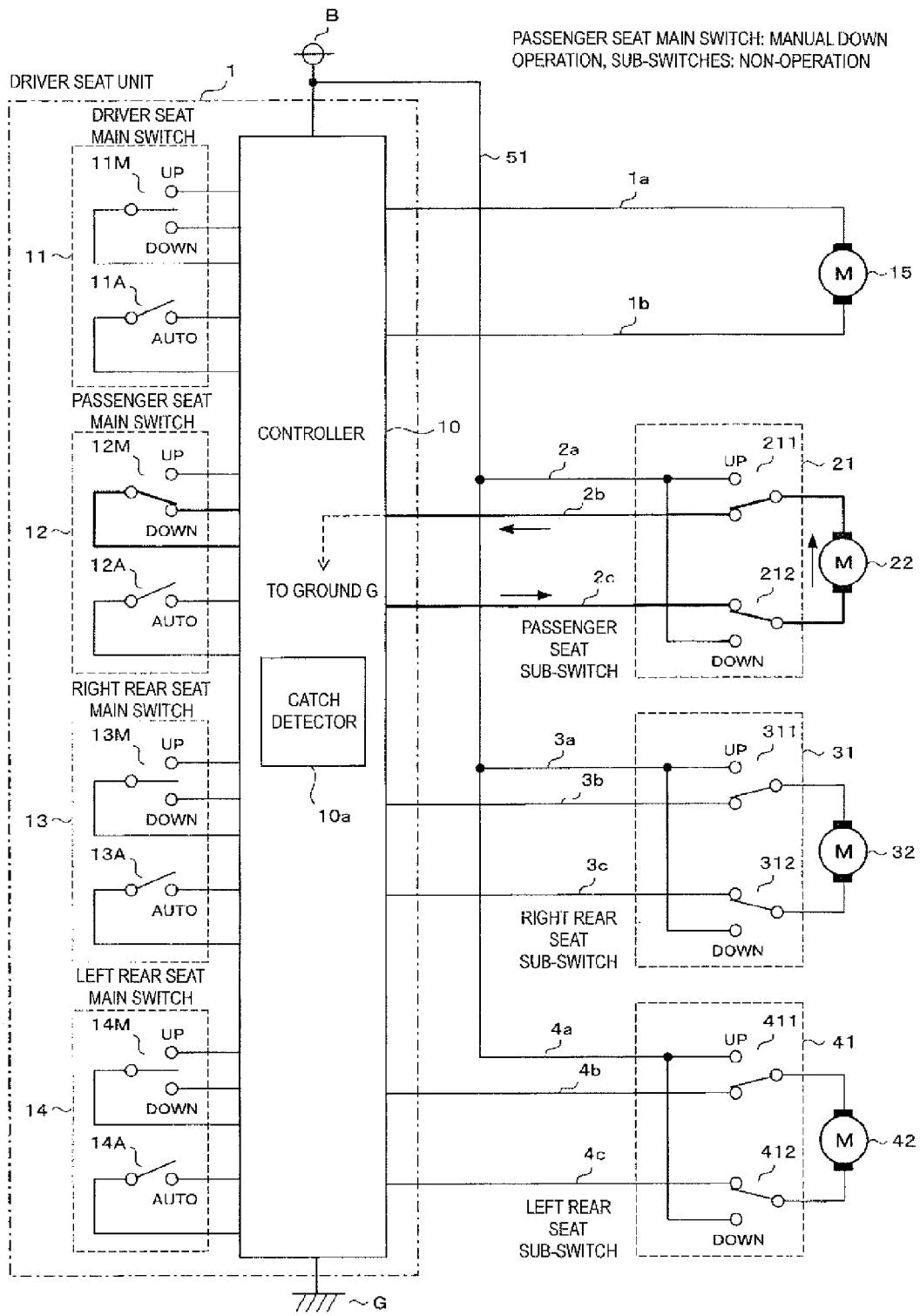
FIG. 6 is a view illustrating a circuit state in the case that the passenger seat main switch performs the manual DOWN operation while the sub-switches are not operated.

FIG. 6 illustrates a circuit state in the case that the passenger seat main switch 12 of the driver seat performs the manual DOWN operation while the sub-switches 21, 31, and 41 of other seats are not operated. In the state in FIG. 6, the manual contact 12M of the passenger seat main switch 12 switches onto the DOWN side (the window opening side). Based on the signal input from the passenger seat main switch 12, the controller 10 connects the wiring 2c to the power supply B, and connects the wiring 2b to the ground G. Therefore, the current is passed through the wiring 2c, the passenger seat motor 22, and the wiring 2b in the arrow direction (the opposite direction to that of FIG. 5), and the motor 22 rotates reversely. As a result, the window of the passenger seat performs the opening action while the passenger seat main switch 12 performs the manual DOWN operation. When the manual DOWN operation of the passenger seat main switch 12 is released, the current is not passed through the passenger seat motor 22, the motor 22 stops, and the opening action of the window of the passenger seat also stops. Thus, the opening action of the window of the passenger seat can be performed from the driver seat.

In the main switches 11 to 14, because the action in the case that the right rear seat main switch 13 or the left rear seat main switch 14 is operated is similar to the action in the case that the passenger seat main switch 12 is operated, the detailed description is omitted.

(2) The Case that Only the Sub-switch is Operated

Figure 7:
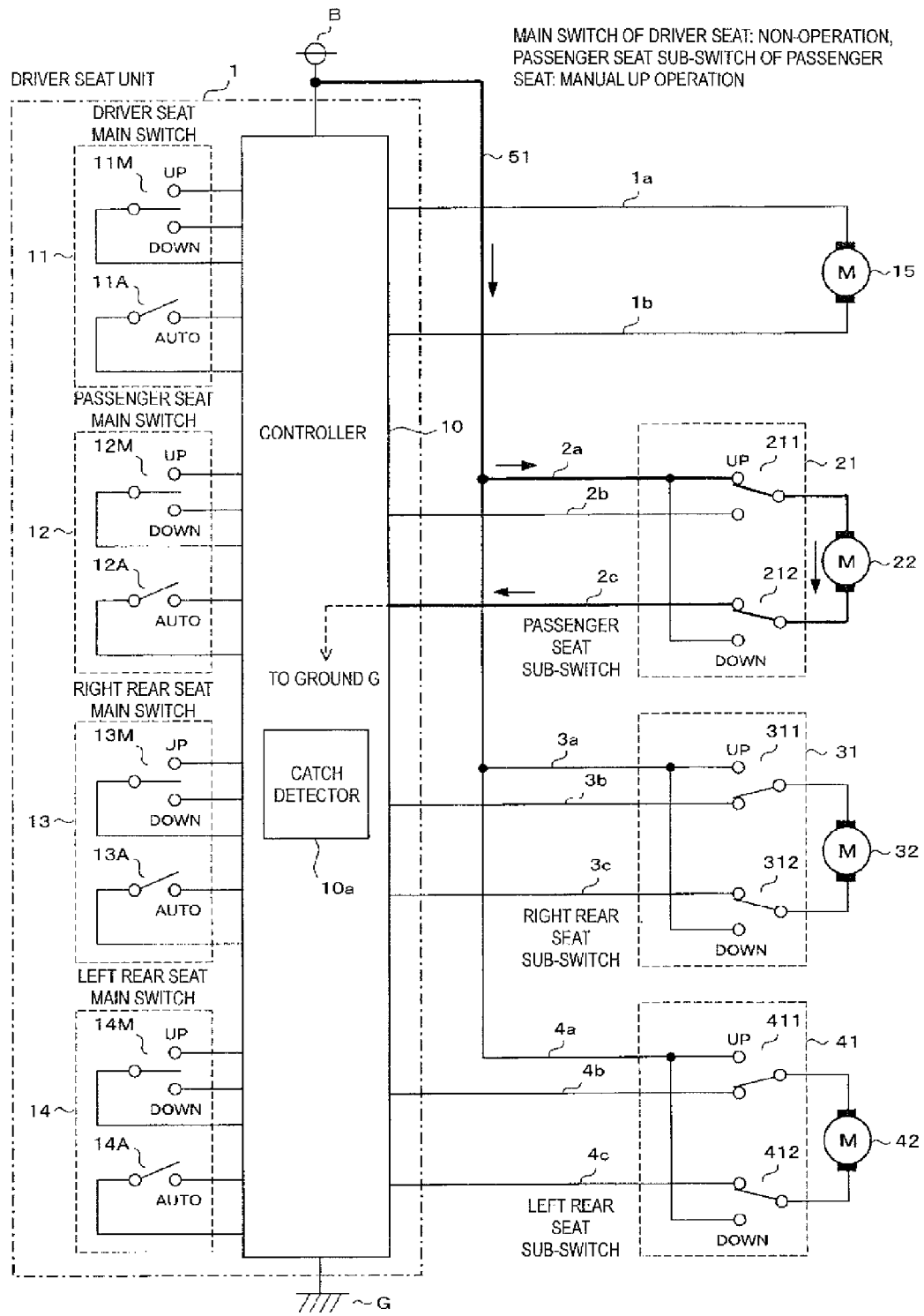
FIG. 7 is a view illustrating a circuit state in the case that the passenger seat sub-switch performs the manual UP operation while the main switches are not operated.

FIG. 7 illustrates a circuit state in the case that the passenger seat sub-switch 21 of the passenger seat performs the manual UP operation while the main switches 11 to 14 of the driver seat are not operated. In the state in FIG. 7, the contact 211 of the passenger seat sub-switch 21 switches onto the UP side (the window closing side). The controller 10 connects the contact 212 to the ground G through the wiring 2c. Therefore, the current is passed through the power-supply line 51, the wiring 2a, the contact 211, the passenger seat motor 22, the contact 212, and the wiring 2c from the power supply B in the arrow direction, and the motor 22 rotates normally. As a result, the window of the passenger seat performs the closing action while the passenger seat sub-switch 21 performs the manual UP operation. When the manual UP operation of the passenger seat sub-switch 21 is released, the contact 211 returns, the current is not passed through the passenger seat motor 22, the motor 22 stops, and the closing action of the window of the passenger seat also stops.

Figure 8:
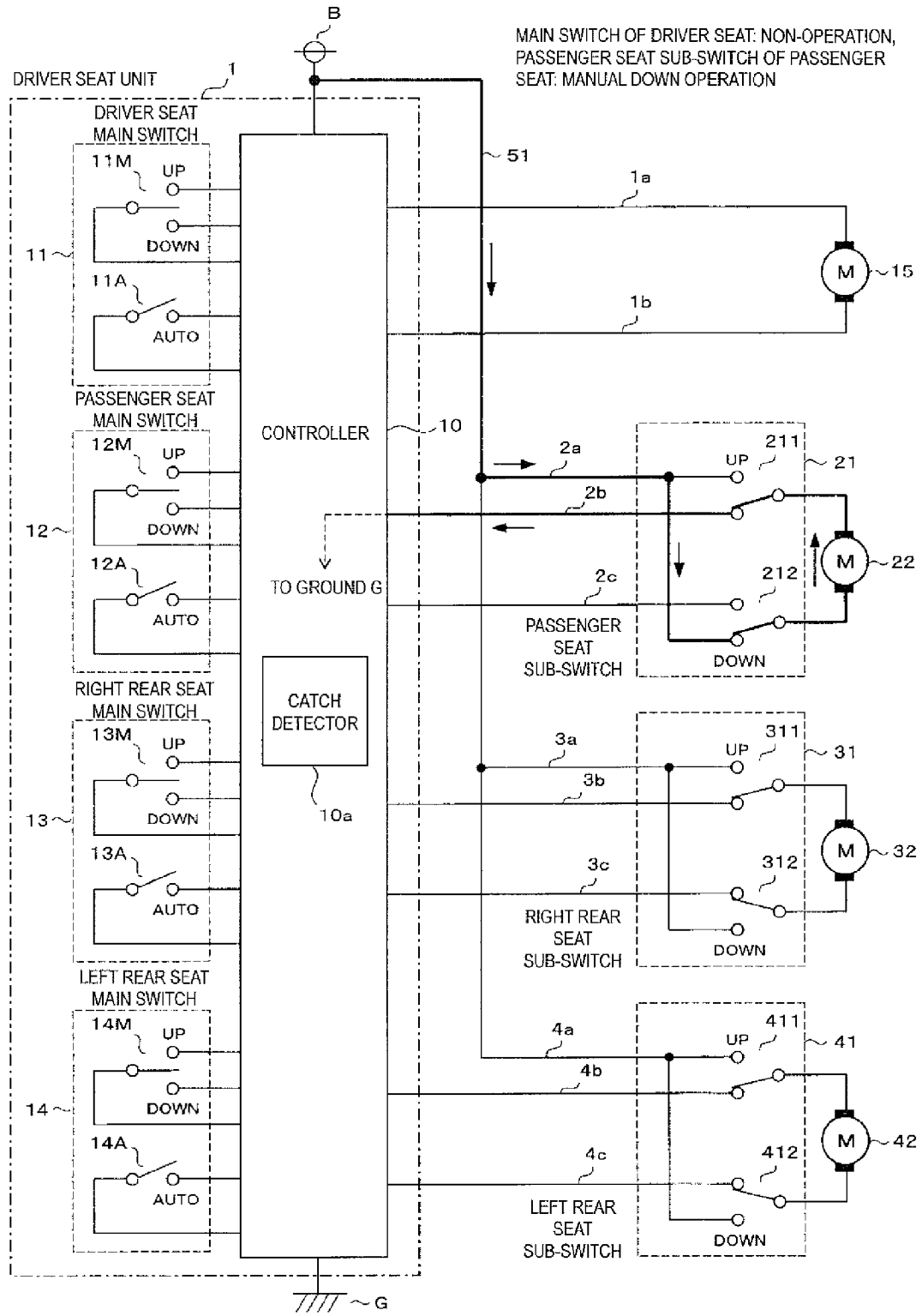
FIG. 8 is a view illustrating a circuit state in the case that the passenger seat sub-switch performs the manual DOWN operation while the main switches are not operated.

FIG. 8 illustrates a circuit state in the case that the passenger seat sub-switch 21 of the passenger seat performs the manual DOWN operation while the main switches 11 to 14 of the driver seat are not operated. In the state in FIG. 8, the contact 212 of the passenger seat sub-switch 21 switches onto the DOWN side (the window opening side). The controller 10 connects the contact 211 to the ground G through the wiring 2b. Therefore, the current is passed through the power-supply line 51, the wiring 2a, the contact 212, the passenger seat motor 22, the contact 211, and the wiring 2b from the power supply B in the arrow direction (the opposite direction to that of FIG. 7), and the motor 22 rotates reversely. As a result, the window of the passenger seat performs the opening action while the passenger seat sub-switch 21 performs the manual DOWN operation. When the manual DOWN operation of the passenger seat sub-switch 21 is released, the contact 212 returns, the current is not passed through the passenger seat motor 22, the motor 22 stops, and the opening action of the window of the passenger seat also stops.

(3) The Case that Both the Main Switch and the Sub-switch are Operated

<The Case that the Main Switch and the Sub-switch are Operated in the Identical Direction>

Figure 9:
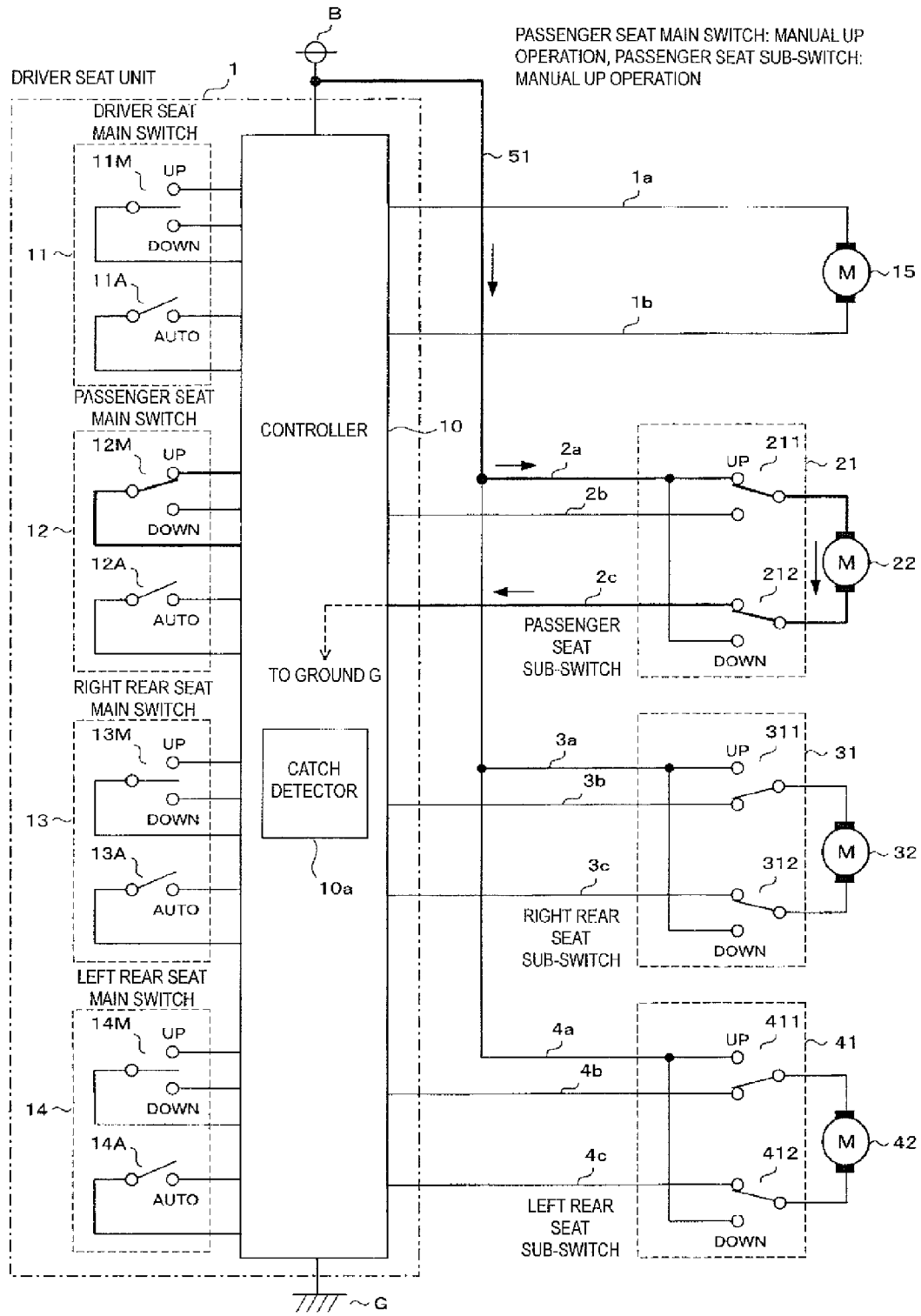
FIG. 9 is a view illustrating a circuit state in the case that both the passenger seat main switch and the passenger seat sub-switch perform the manual UP operation.

FIG. 9 illustrates a circuit state in the case that both the passenger seat main switch 12 of the driver seat and the passenger seat sub-switch 21 of the passenger seat perform the manual UP operation. In the state in FIG. 9, the manual contact 12M of the passenger seat main switch 12 switches onto the UP side (the window closing side). The contact 211 of the passenger seat sub-switch 21 switches onto the UP side (the window closing side). Similarly to the case in FIG. 5, based on the signal input from the passenger seat main switch 12, the controller 10 connects the wiring 2b to the power supply B, and connects the wiring 2c to the ground G. However, because the contact 211 of the passenger seat sub-switch 21 switches onto the UP side, the electric power is not supplied from the power supply B to the passenger seat motor 22 through the wiring 2b. On the other hand, when the contact 211 switches onto the UP side, the current is passed through the power-supply line 51, the wiring 2a, the contact 211, the passenger seat motor 22, the contact 212, and the wiring 2c from the power supply B in the arrow direction, and the motor 22 rotates normally. In this case, a trouble is not generated in the action because the current is passed through the passenger seat motor 22 in the direction that is instructed by the passenger seat main switch 12 of the driver seat and the passenger seat sub-switch 21 of the passenger seat.

Figure 10:
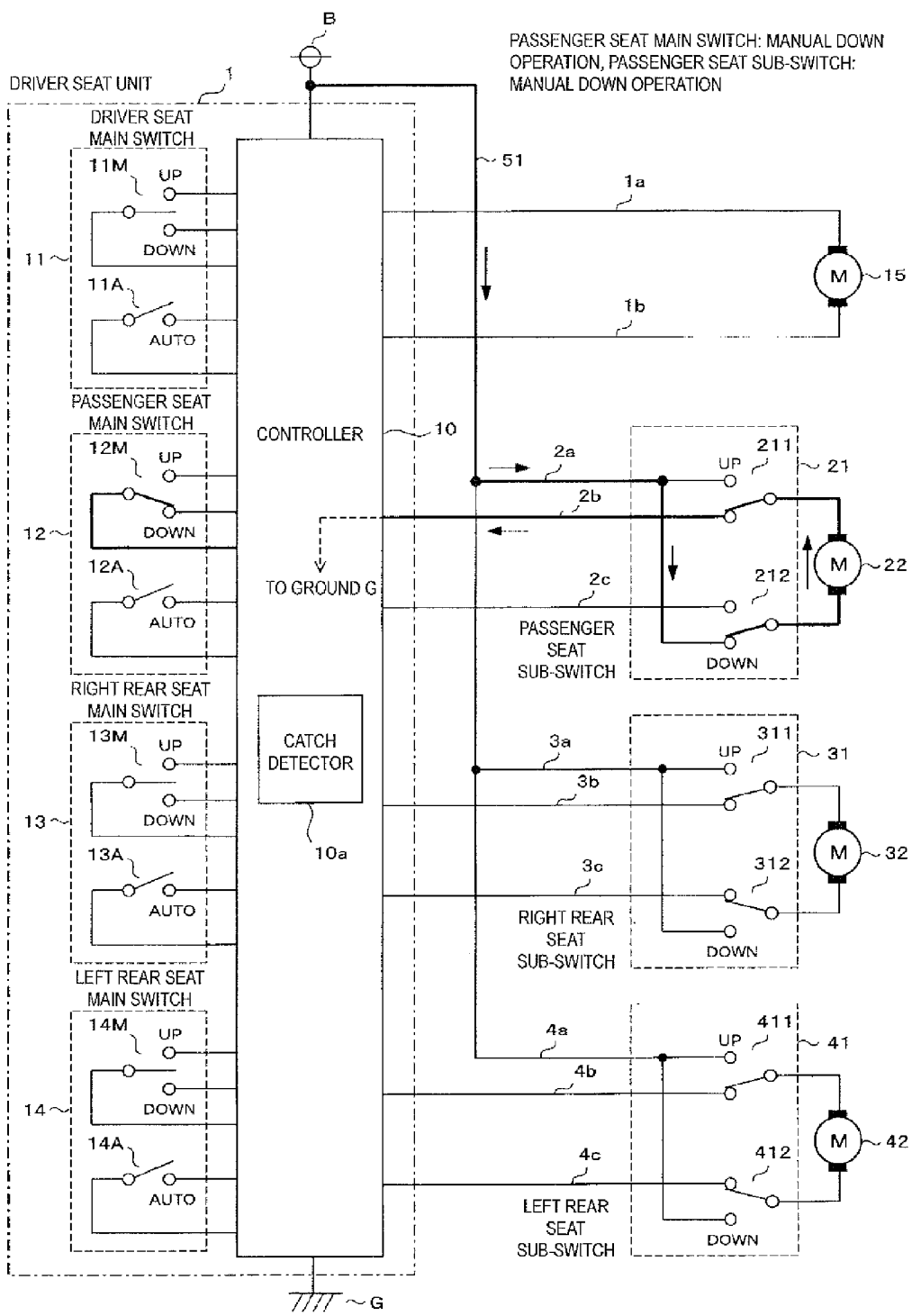
FIG. 10 is a view illustrating a circuit state in the case that both the passenger seat main switch and the passenger seat sub-switch perform the manual DOWN operation.

FIG. 10 illustrates a circuit state in the case that both the passenger seat main switch 12 of the driver seat and the passenger seat sub-switch 21 of the passenger seat perform the manual DOWN operation. In the state in FIG. 10, the manual contact 12M of the passenger seat main switch 12 switches onto the DOWN side (the window opening side). The contact 212 of the passenger seat sub-switch 21 switches onto the DOWN side (the window opening side). Similarly to the case in FIG. 6, based on the signal input from the passenger seat main switch 12, the controller 10 connects the wiring 2c to the power supply B, and connects the wiring 2b to the ground G. However, because the contact 212 of the passenger seat sub-switch 21 switches onto the DOWN side, the electric power is not supplied from the power supply B to the passenger seat motor 22 through the wiring 2c. On the other hand, when the contact 212 switches onto the DOWN side, the current is passed through the power-supply line 51, the wiring 2a, the contact 212, the passenger seat motor 22, the contact 211, and the wiring 2b from the power supply B in the arrow direction (the opposite direction to that of FIG. 9), and the motor 22 rotates reversely. In this case, the trouble is not generated in the action because the current is passed through the passenger seat motor 22 in the direction that is instructed by the passenger seat main switch 12 of the driver seat and the passenger seat sub-switch 21 of the passenger seat.

Figure 11:
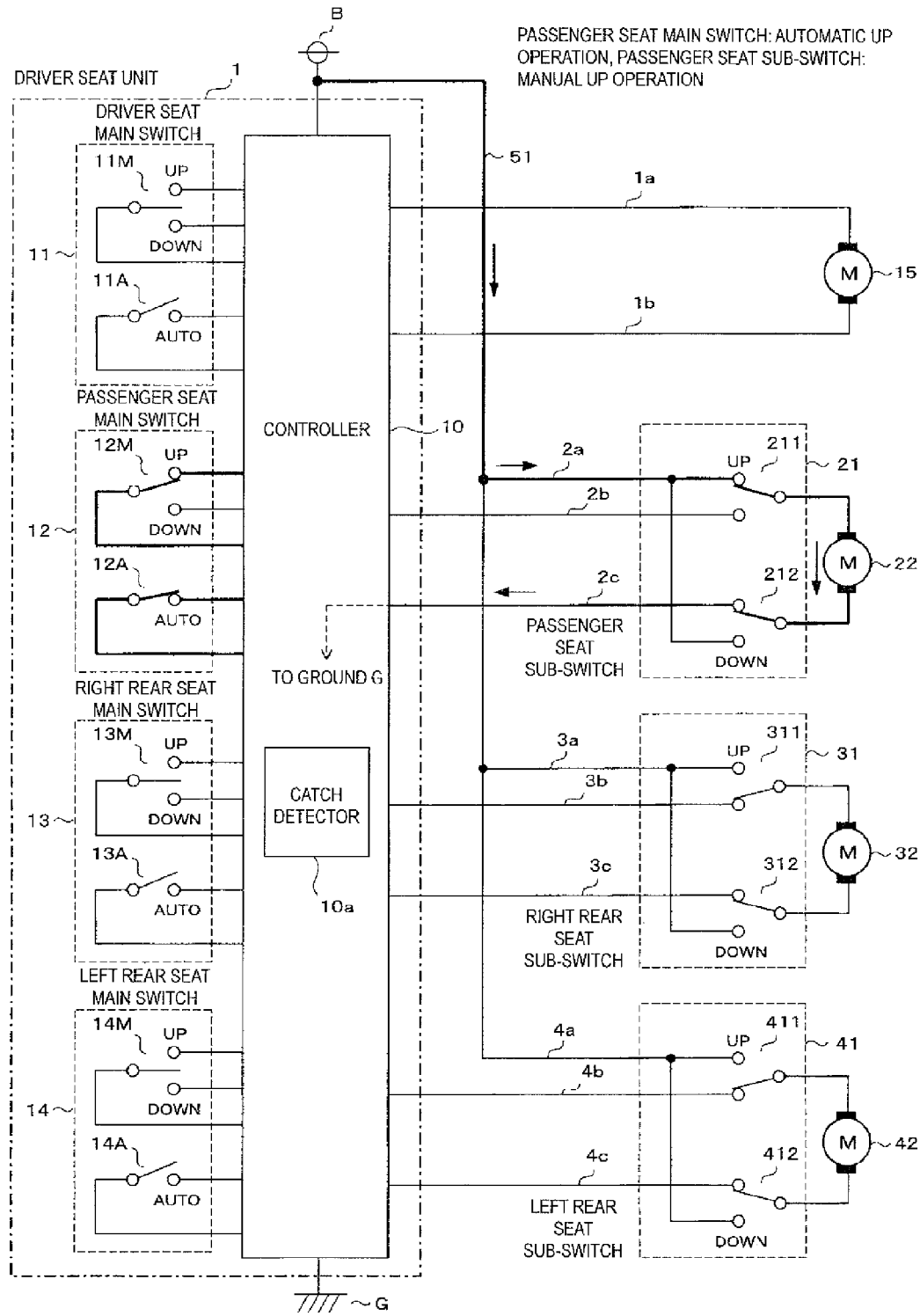
FIG. 11 is a view illustrating a circuit state in the case that the passenger seat main switch performs an automatic UP operation while the passenger seat sub-switch performs the manual UP operation.

FIG. 11 illustrates a circuit state in the case that the passenger seat main switch 12 of the driver seat performs the automatic UP operation while the passenger seat sub-switch 21 of the passenger seat performs the manual UP operation. In the state in FIG. 11, the automatic contact 12A is turned on while the manual contact 12M of the passenger seat main switch 12 switches onto the UP side (the window closing side). The contact 211 of the passenger seat sub-switch 21 switches onto the UP side (the window closing side). Based on the signal input from the passenger seat main switch 12, the controller 10 connects the wiring 2b to the power supply B, and connects the wiring 2c to the ground G. However, because the contact 211 of the passenger seat sub-switch 21 switches onto the UP side, the electric power is not supplied from the power supply B to the passenger seat motor 22 through the wiring 2b. On the other hand, when the contact 211 switches onto the UP side, the current is passed through the power-supply line 51, the wiring 2a, the contact 211, the passenger seat motor 22, the contact 212, and the wiring 2c from the power supply B in the arrow direction, and the motor 22 rotates normally. In this case, the trouble is not generated in the action because the current is passed through the passenger seat motor 22 in the direction that is instructed by the passenger seat main switch 12 of the driver seat and the passenger seat sub-switch 21 of the passenger seat. Even if the manual UP operation of the passenger seat sub-switch 21 is released on the way, based on the automatic UP operation of the passenger seat main switch 12, the controller 10 continues the normal rotation of the motor 22 until the window is fully closed.

Figure 12:
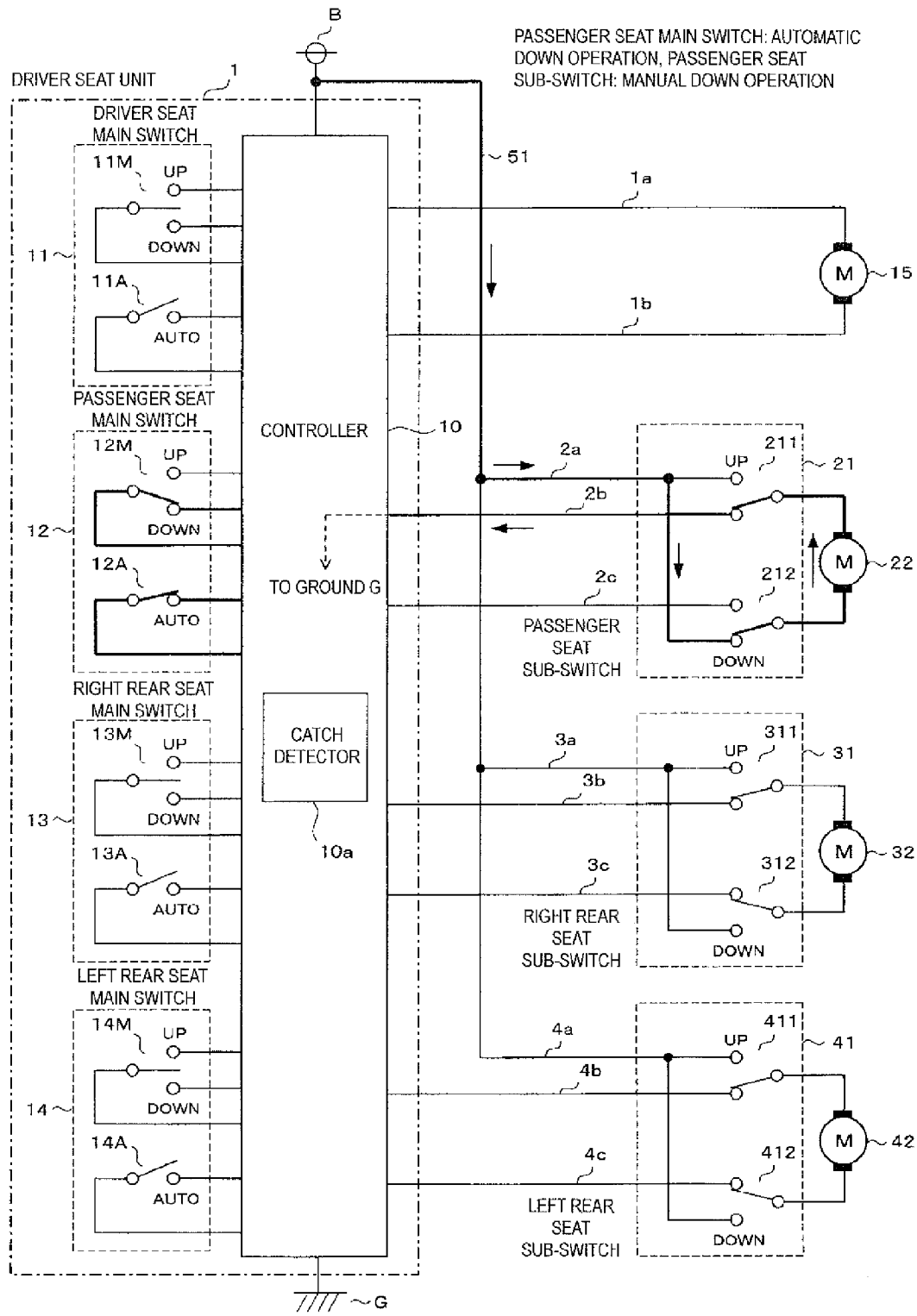
FIG. 12 is a view illustrating a circuit state in the case that the passenger seat main switch performs an automatic DOWN operation while the passenger seat sub-switch performs the manual DOWN operation.

FIG. 12 illustrates a circuit state in the case that the passenger seat main switch 12 of the driver seat performs the automatic DOWN operation while the passenger seat sub-switch 21 of the passenger seat performs the manual DOWN operation. In the state in FIG. 12, the automatic contact 12A is turned on while the manual contact 12M of the passenger seat main switch 12 switches onto the DOWN side (the window opening side). The contact 212 of the passenger seat sub-switch 21 switches onto the DOWN side (the window opening side). Based on the signal input from the passenger seat main switch 12, the controller 10 connects the wiring 2c to the power supply B, and connects the wiring 2b to the ground G. However, because the contact 212 of the passenger seat sub-switch 21 switches onto the DOWN side, the electric power is not supplied from the power supply B to the passenger seat motor 22 through the wiring 2c. On the other hand, when the contact 212 switches onto the DOWN side, the current is passed through the power-supply line 51, the wiring 2a, the contact 212, the passenger seat motor 22, the contact 211, and the wiring 2b from the power supply B in the arrow direction (the opposite direction to that of FIG. 11), and the motor 22 rotates reversely. In this case, the trouble is not generated in the action because the current is passed through the passenger seat motor 22 in the direction that is instructed by the passenger seat main switch 12 of the driver seat and the passenger seat sub-switch 21 of the passenger seat. Even if the manual DOWN operation of the passenger seat sub-switch 21 is released on the way, based on the automatic DOWN operation of the passenger seat main switch 12, the controller 10 continues the reverse rotation of the motor 22 until the window is fully opened.

<The Case that the Main Switch and the Sub-switch are Operated in the Opposite Directions to Each Other>

Figure 13:
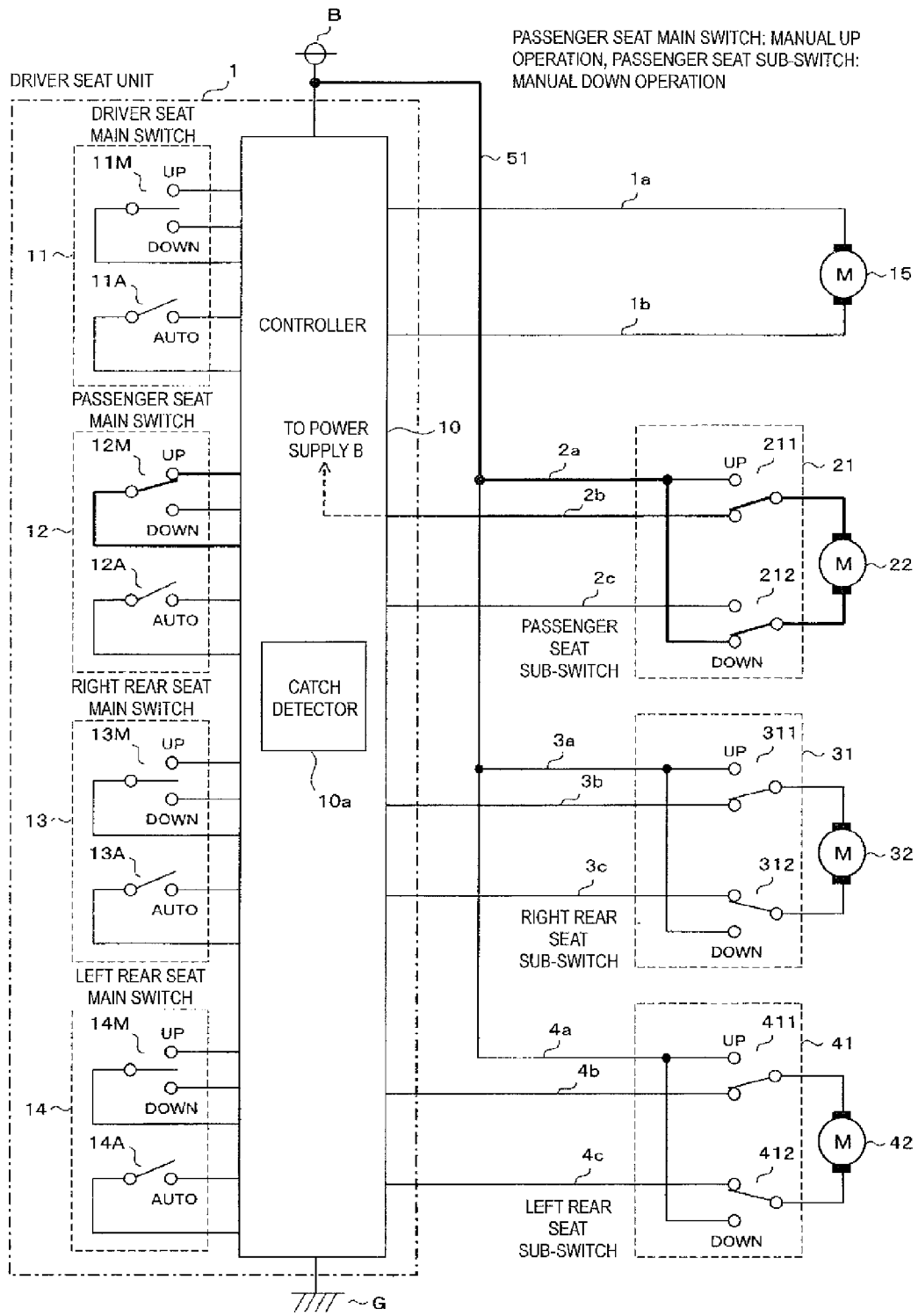
FIG. 13 is a view illustrating a circuit state in the case that the passenger seat main switch performs the manual UP operation while the passenger seat sub-switch performs the manual DOWN operation.

FIG. 13 illustrates a circuit state in the case that the passenger seat main switch 12 of the driver seat performs the manual UP operation while the passenger seat sub-switch 21 of the passenger seat performs the manual DOWN operation. In the state in FIG. 13, the manual contact 12M of the passenger seat main switch 12 switches onto the UP side (the window closing side). The contact 212 of the passenger seat sub-switch 21 switches onto the DOWN side (the window opening side). Accordingly, there is a contradiction between the operations of the switches 12 and 21. Because the controller 10 connects the wiring 2b to the power supply B (wiring 2c is connected to the ground G) based on the signal input from the passenger seat main switch 12, one end of the passenger seat motor 22 is connected to the power supply B through the contact 211 and the wiring 2b, and the other end of the passenger seat motor 22 is connected to the power supply B through the contact 212, the wiring 2a, and the power-supply line 51. Accordingly, the current is not passed through the motor 22 because both the ends of the passenger seat motor 22 are connected to the power supply B to become an identical potential. The passenger seat motor 22 stops, but the opening and closing of the window of the passenger seat are not performed. Therefore, the generation of the trouble caused by the contradictory operations is avoided in the action.

When one of the switch operations of the switches 12 and 21 is released from the state in FIG. 13, the passenger seat motor 22 rotates according to the other switch operation. For example, when the manual UP operation of the passenger seat main switch 12 is released, the controller 10 connects the wiring 2b to the ground G. Therefore, the current route in FIG. 8 is formed, and the passenger seat motor 22 rotates reversely to perform the action corresponding to the manual DOWN operation of the passenger seat sub-switch 21. When the manual DOWN operation of the passenger seat sub-switch 21 is released, the controller 10 connects the wiring 2c to the ground G. Therefore, the current route in FIG. 5 is formed, and the passenger seat motor 22 rotates normally to perform the action corresponding to the manual UP operation of the passenger seat main switch 12.

Figure 14:
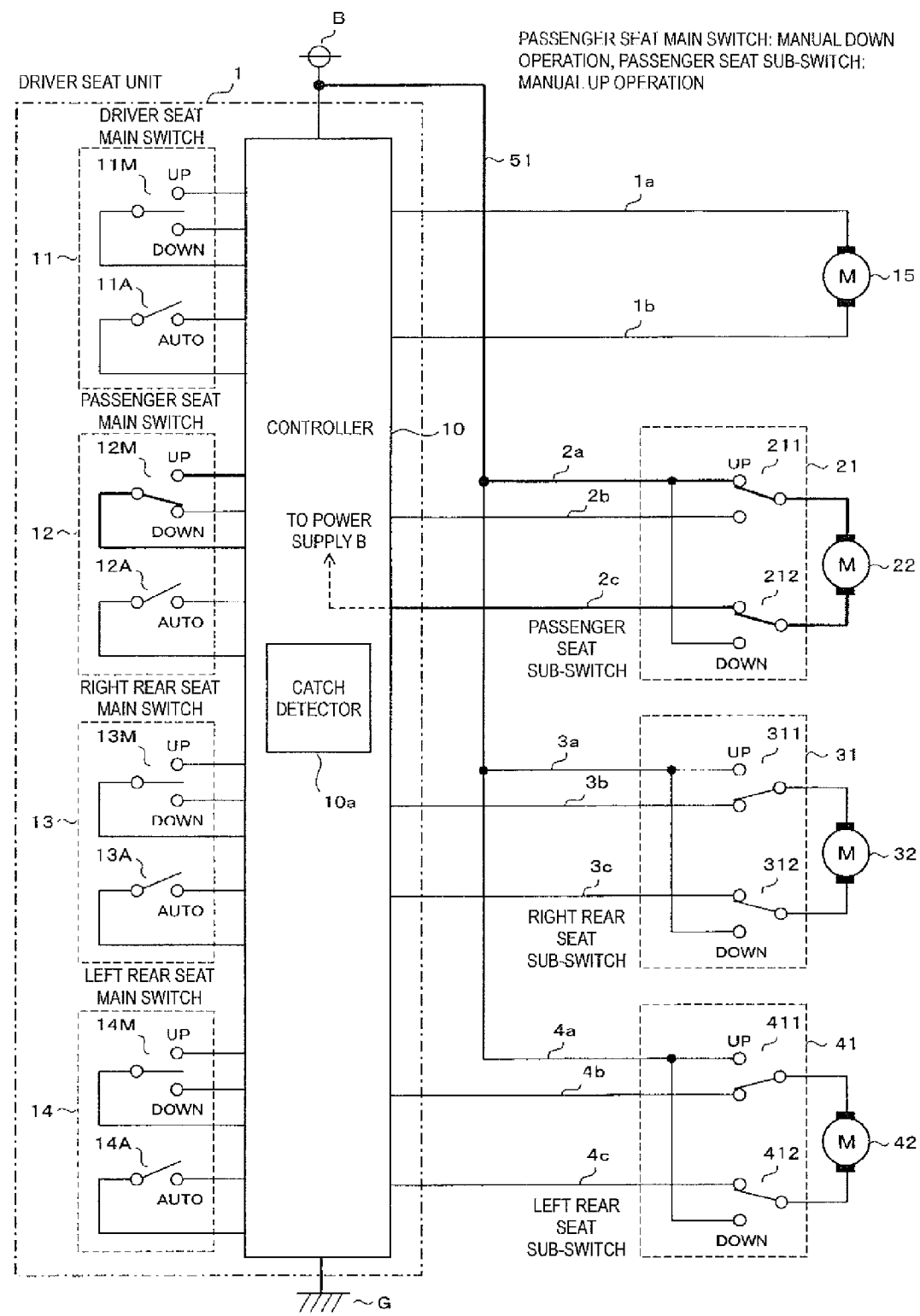
FIG. 14 is a view illustrating a circuit state in the case that the passenger seat main switch performs the manual DOWN operation while the passenger seat sub-switch performs the manual UP operation.

FIG. 14 illustrates a circuit state in the case that the passenger seat main switch 12 of the driver seat performs the manual DOWN operation while the passenger seat sub-switch 21 of the passenger seat performs the manual UP operation. In the state in FIG. 14, the manual contact 12M of the passenger seat main switch 12 switches onto the DOWN side (the window opening side). The contact 211 of the passenger seat sub-switch 21 switches onto the UP side (the window closing side). Accordingly, there is a contradiction between the operations of the switches 12 and 21. Because the controller 10 connects the wiring 2c to the power supply B (wiring 2b is connected to the ground G) based on the signal input from the passenger seat main switch 12, one end of the passenger seat motor 22 is connected to the power supply B through the contact 211, the wiring 2a, and the power-supply line 51, and the other end of the passenger seat motor 22 is connected to the power supply B through the contact 212 and the wiring 2c. Accordingly, the current is not passed through the motor 22 because both the ends of the passenger seat motor 22 are connected to the power supply B to become an identical potential. The passenger seat motor 22 stops, but the opening and closing of the window of the passenger seat are not performed. Therefore, the generation of the trouble caused by the contradictory operations is avoided in the action.

When one of the switch operations of the switches 12 and 21 is released from the state in FIG. 14, the passenger seat motor 22 rotates according to the other switch operation. For example, when the manual DOWN operation of the passenger seat main switch 12 is released, the controller 10 connects the wiring 2c to the ground G. Therefore, the current route in FIG. 9 is formed, and the passenger seat motor 22 rotates normally to perform the action corresponding to the manual UP operation of the passenger seat sub-switch 21. When the manual UP operation of the passenger seat sub-switch 21 is released, the controller 10 connects the wiring 2b to the ground G. Therefore, the current route in FIG. 6 is formed, and the passenger seat motor 22 rotates reversely to perform the action corresponding to the manual DOWN operation of the passenger seat main switch 12.

Figure 15:
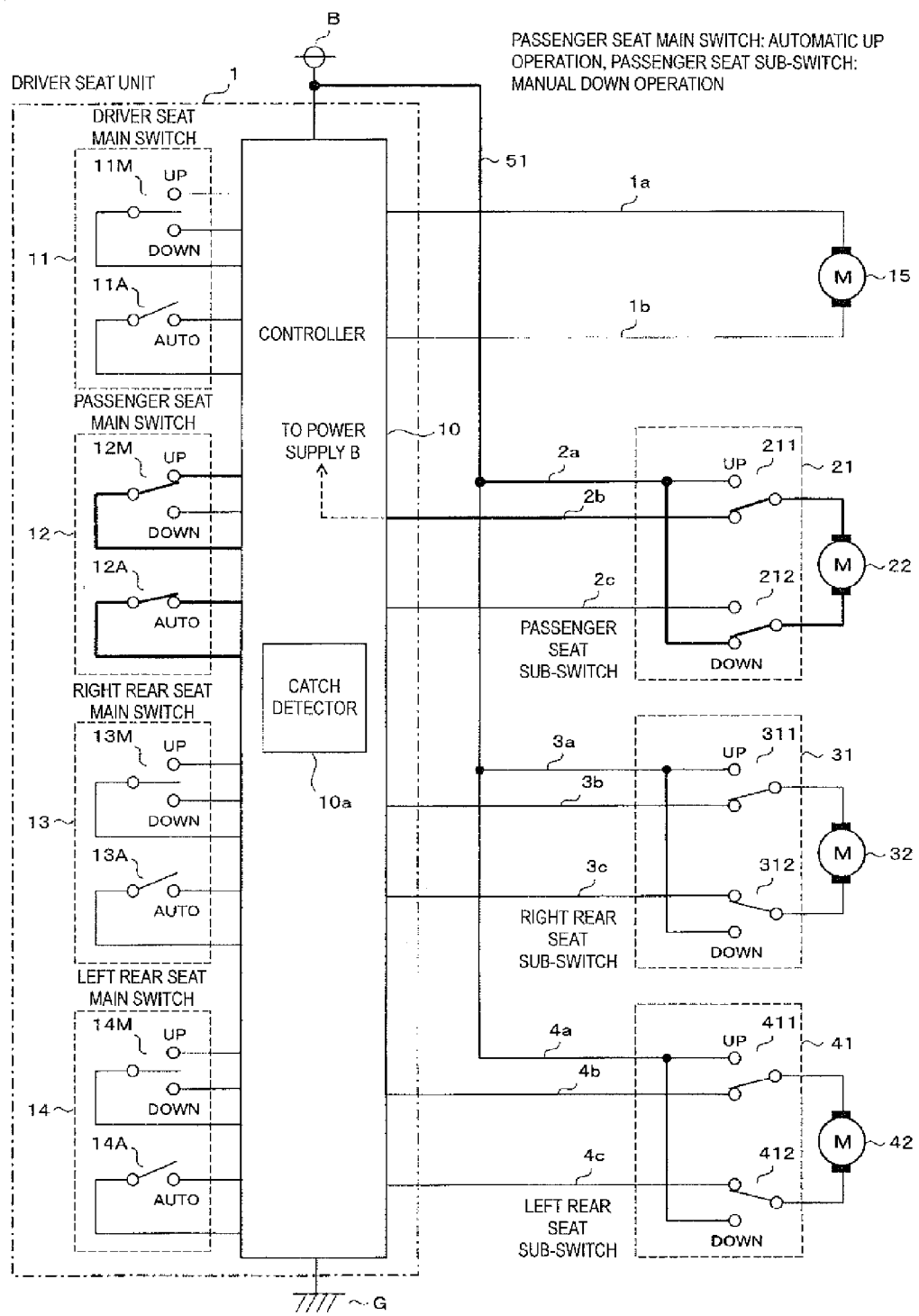
FIG. 15 is a view illustrating a circuit state in the case that the passenger seat main switch performs the automatic UP operation while the passenger seat sub-switch performs the manual DOWN operation.

FIG. 15 illustrates a circuit state in the case that the passenger seat main switch 12 of the driver seat performs the automatic UP operation while the passenger seat sub-switch 21 of the passenger seat performs the manual DOWN operation. In the state in FIG. 15, the automatic contact 12A is turned on while the manual contact 12M of the passenger seat main switch 12 switches onto the UP side (the window closing side). The contact 212 of the passenger seat sub-switch 21 switches onto the DOWN side (the window opening side). Because the controller 10 connects the wiring 2b to the power supply B (wiring 2c is connected to the ground G) based on the signal input from the passenger seat main switch 12, one end of the passenger seat motor 22 is connected to the power supply B through the contact 211 and the wiring 2b, and the other end of the passenger seat motor 22 is connected to the power supply B through the contact 212, the wiring 2a, and the power-supply line 51. Accordingly, the current is not passed through the motor 22 because both the ends of the passenger seat motor 22 are connected to the power supply B to become an identical potential. The passenger seat motor 22 stops, but the opening and closing of the window of the passenger seat are not performed. Therefore, the generation of the trouble caused by the contradictory operations is avoided in the action.

In the case in FIG. 15, because the passenger seat main switch 12 performs the automatic UP operation, the catch detector 10*a* of the controller 10 determines that catch is generated in the window of the passenger seat when the passenger seat motor 22 stops. Based on a determination result, the controller 10 stops the automatic UP action (the closing action) of the window of the passenger seat. After the automatic UP action is stopped, the action in FIG. 8 is performed according to the manual DOWN operation of the passenger seat sub-switch 21.

Figure 16:
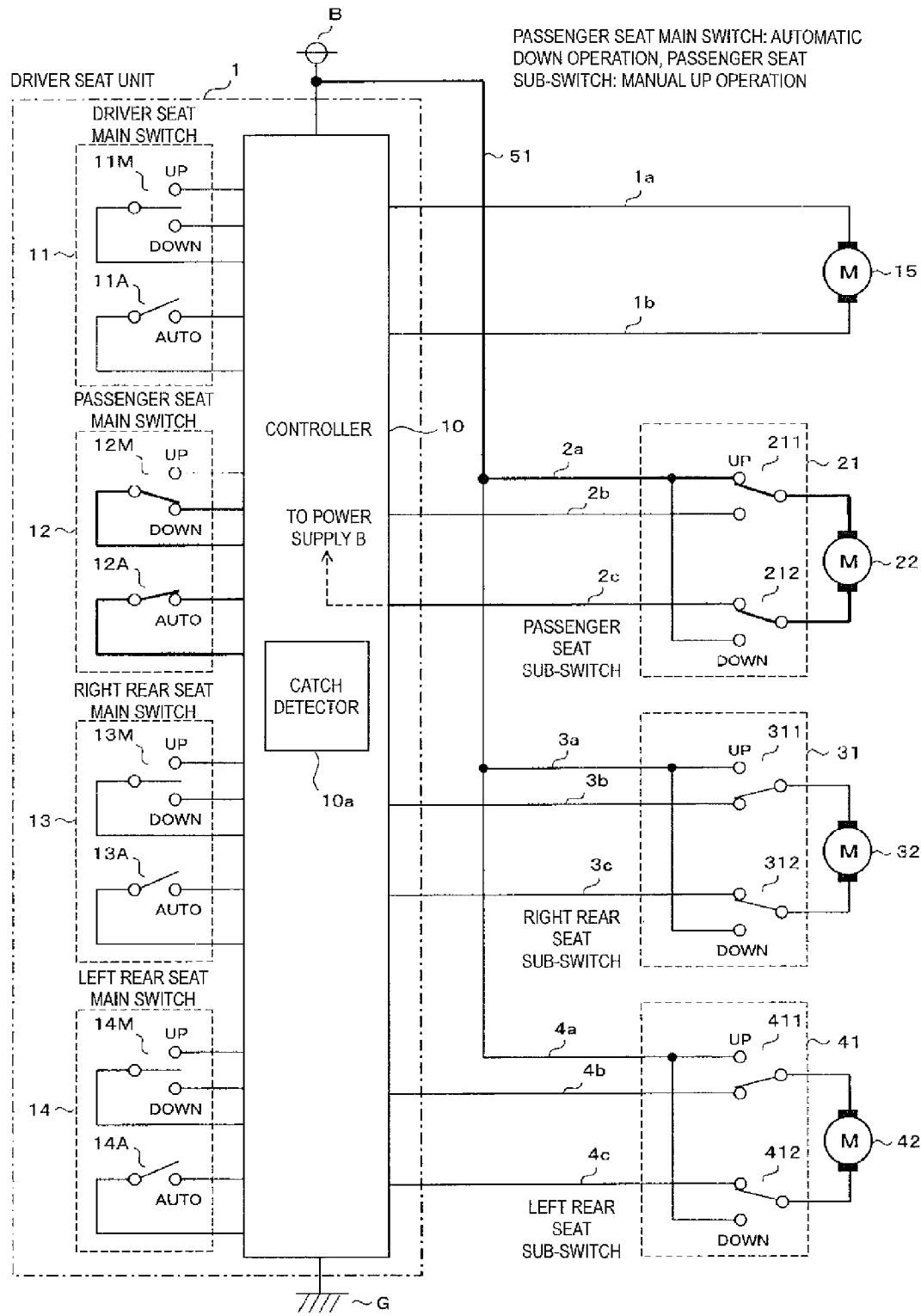
FIG. 16 is a view illustrating a circuit state in the case that the passenger seat main switch performs the automatic DOWN operation while the passenger seat sub-switch performs the manual UP operation.

FIG. 16 illustrates a circuit state in the case that the passenger seat main switch 12 of the driver seat performs the automatic DOWN operation while the passenger seat sub-switch 21 of the passenger seat performs the manual UP operation. In the state in FIG. 16, the automatic contact 12A is turned on while the manual contact 12M of the passenger seat main switch 12 switches onto the DOWN side (the window opening side). The contact 211 of the passenger seat sub-switch 21 switches onto the UP side (the window closing side). Because the controller 10 connects the wiring 2*c* to the power supply B (wiring 2*b* is connected to the ground G) based on the signal input from the passenger seat main switch 12, one end of the passenger seat motor 22 is connected to the power supply B through the contact 211, the wiring 2*a*, and the power-supply line 51, and the other end of the passenger seat motor 22 is connected to the power supply B through the contact 212 and the wiring 2*c*. Accordingly, the current is not passed through the motor 22 because both the ends of the passenger seat motor 22 are connected to the power supply B to become an identical potential. The passenger seat motor 22 stops, but the opening and closing of the window of the passenger seat are not performed. Therefore, the generation of the trouble caused by the contradictory operations is avoided in the action.

In the case in FIG. 16, the catch is not usually generated because the passenger seat main switch 12 performs the automatic DOWN operation (the opening action). However, because the passenger seat motor 22 stops, the controller 10 makes the determination similar to that during the generation of the catch, and stops the automatic DOWN action of the window of the passenger seat. After the automatic DOWN action is stopped, the action in FIG. 7 is performed according to the manual UP operation of the passenger seat sub-switch 21.

In one or more embodiments, the passenger seat main switch 12 of the driver seat and the passenger seat sub-switch 21 of the passenger seat are operated by way of example. Because the similar action is performed in the case that the right rear seat main switch 13 of the driver seat and the right rear seat sub-switch 31 of the passenger seat are operated or in the case that the left rear seat main switch 14 of the driver seat and the left rear seat sub-switch 41 of the passenger seat are operated, the detailed description of these cases is omitted.

Figure 17A:
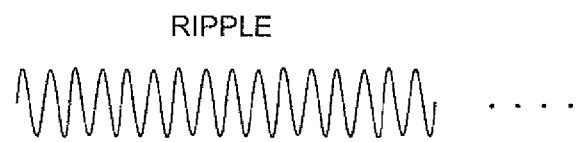
FIGS. 17A and 17B are views illustrating a ripple of a motor current and a waveform of a converted pulse in a normal state.

A method for detecting a catch will be described below. The controller 10 always monitors the currents (motor currents) passed through the wirings 1*a*, 1*b*, 2*b*, 2*c*, 3*b*, 3*c*, 4*b*, and 4*c*, and the catch detector 10*a* detects a catch based on the states of the currents. A ripple is included in the motor current passed through each wiring. In the state in which the catch is not generated, a waveform of the ripple has a stable waveform as illustrated in FIG. 17A. The controller 10 converts the ripple into a pulse string as illustrated in FIG. 17B.

Figure 17B:
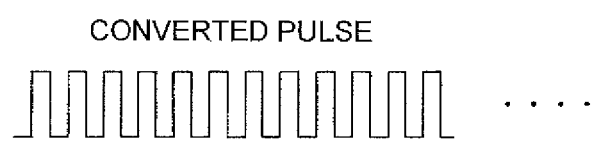

The controller 10 calculates the number of rotations of each of the motors 15, 22, 32, and 42 based on the pulse string in FIG. 17B. The opening and closing positions of the windows of the driver seat and other seats can be detected by calculating the number of rotations of the motors. Therefore, a sensor that detects the window position is eliminated.

Figure 18A:
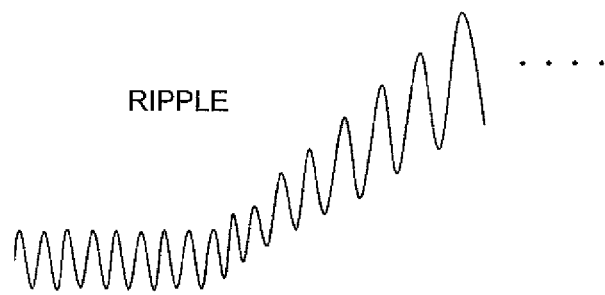
FIGS. 18A and 18B are views illustrating the ripple of the motor current and the waveform of the converted pulse in generating catch.
Figure 18B:
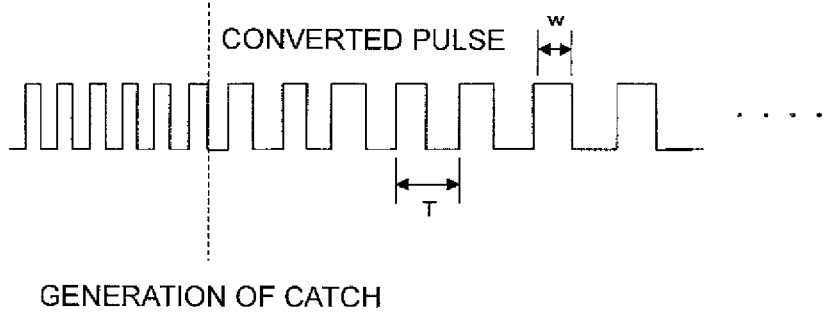

When the catch is generated, the ripple of the motor current becomes the unstable waveform in which a current level increases while a period is lengthened as illustrated in FIG. 18A. When the ripple is converted into the pulse string, the pulse string in FIG. 18B is obtained. A change of a period T is monitored in the pulse string, and the catch detector 10*a* determines that the catch is generated when the period T becomes a given value of more. Alternatively, the catch detector 10*a* may determine that the catch is generated when a pulse width w becomes a given value of more instead of the period T. Thus, the catch can be detected based on the ripple of the motor current.

Figure 19A:
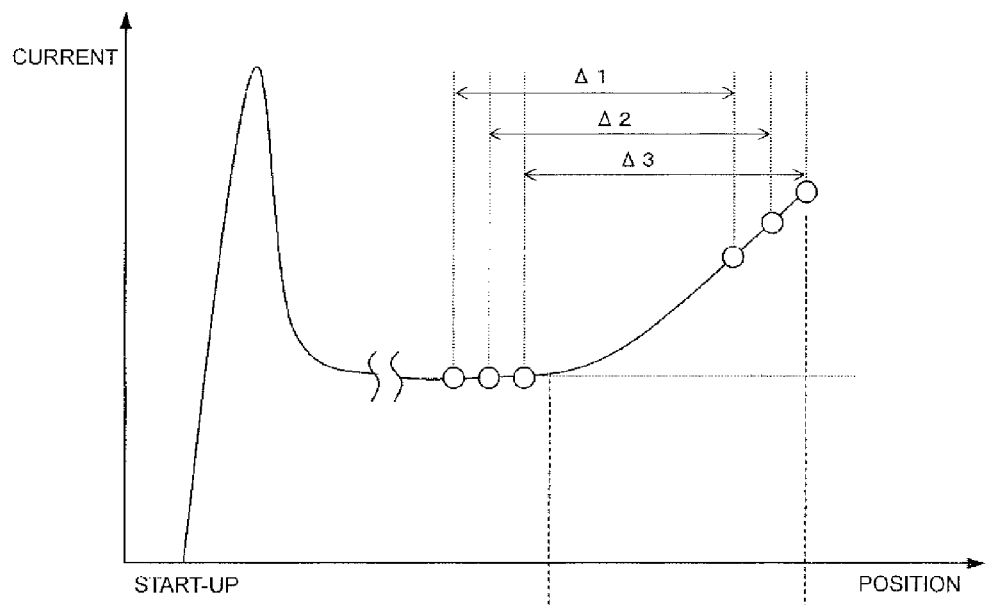
FIGS. 19A and B are views illustrating another example of a method for detecting the catch.
Figure 19B:
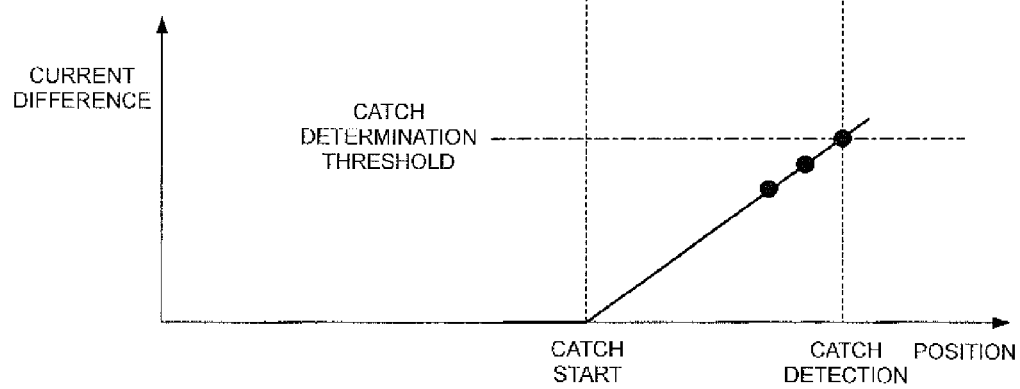

A method for monitoring a change of a current value can be cited as another example of the catch detecting method. FIG. 19A illustrates a change in motor current. The motor current increases steeply because an inrush current is passed during starting of the motor, and then the motor current settles in the stable state. However, when the catch is generated, the motor becomes a locked state, and the motor current increases. Therefore, differences $\Delta 1$, $\Delta 2$, $\Delta 3$, . . . between the present current value and the past current value are calculated, the current difference is compared to a catch determination threshold as illustrated in FIG. 19B, and the determination that the catch is generated is made when the current difference exceeds the threshold.

According to one or more embodiments, the driver seat unit 1 and the driver seat motor 15 are connected to each other by the wirings 1*a* and 1*b*, and the driver seat unit 1, the sub-switches 21, 31, and 41, and other-seat motors 22, 32, and 42 are connected to one another by the wirings 2*b*, 2*c*, 3*b*, 3*c*, 4*b*, and 4*c*. According to the operation states of the main switches 11 to 14 of the driver seat unit 1, the controller 10 switches the direction of the current passed through each wiring to switch the directions of the currents passed through the motors 15, 22, 32, and 42, which allows the rotation direction of each motor to be controlled.

Therefore, the automatic opening and closing action and the manual opening and closing action of the windows of all the seats can be performed in the driver seat unit 1 by the simple configuration in which the number of wirings is decreased. The controller 10 provided in the driver seat unit 1 monitors the currents of the motors 15, 22, 32, and 42 of the seats, which allows the generation of the catch in all the windows to be detected in the driver seat unit 1. It is not necessary to provide a sensor that detects the generation of the catch, and it is not necessary to provide the controller in each seat. Therefore, the circuit configuration can be simplified.

Conventionally, a system that performs the automatic action only to the window of the driver seat and a system that performs the automatic action to all the windows of the seats are incompatible with each other, and it is necessary to exchange the whole system when the former system is exchanged for the latter system. On the other hand, in one or more embodiments, the driver seat unit 1 is equipped with the main switch 11 to 14 that can perform the automatic action to all the windows of the seats and the controller 10 that detects the catch of all the windows of the seats. Therefore, the function can easily be enhanced only by exchanging the driver seat unit 1. The driver seat unit 1 can easily be provided as a retrofit component or an optional extra.

Various embodiments in addition to the above embodiments are within a scope of the present invention. For example, in the above embodiments, the passenger seat sub-switch 21, the right rear seat sub-switch 31, and the left rear seat sub-switch 41 are cited as an example of the sub-switch 200. Any number of sub-switches can be provided according to the number of seats. In this case, the main switches may be provided according to the number of sub-switches.

In the above embodiment, by way of example, the sub-switches 21, 31, and 41 and other-seat motors 22, 32, and 42 are provided in other seats, respectively. Alternatively to one or more embodiments of the present invention can be applied to the case in which there is only one seat other than the driver seat (for example, only the passenger seat).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle window opening and closing control device comprising:
    a driver seat unit that is provided in a driver seat of a vehicle; and
    a sub-switch that is provided in a seat other than the driver seat,
    wherein the driver seat unit includes a first main switch that operates opening and closing of a first window of the driver seat, a second main switch that operates opening and closing of a second window of the seat other than the driver seal and a controller that controls a driver seat motor provided in the driver seat and an other-seat motor provided in the seat other than the driver seat to perform manual opening and closing and automatic opening and closing of the first and second windows of all seats comprising the driver seat and the seat other than the driver seat based on the operation of the first and second main switches,
    wherein the sub-switch is a switch that performs only the manual opening and closing of the second window using the other-seat motor,
    wherein the first main switch and the second main switch are connected to the controller,
    wherein the controller and the driver seat motor are connected to each other by first and second wirings without the first main switch intervening therebetween, and a direction of a current passed through the driver seat motor and the first and second
    wirings switches according to the opening and closing operation of the first window using the first main switch,
    wherein the controller and the other-seat motor of the seat other than the driver seat are connected to each other by third and fourth wirings through the sub- switch of the seat other than the driver seat without the second main switch intervening therebetween, and a direction of a current passed through the other-seat motor, the third and fourth wirings, and the sub-switch switches according to the opening and closing operation of the second window using the second main switch, and
    wherein the controller comprises a catch detector that detects generation of a catch in the first and second windows, and monitors the currents of the driver seat motor and the other-seat motor passed through the first to fourth wirings, and detects generation of catch in the windows of the driver seat and the seat other than the driver seat based on states of the currents detected by the catch detector.

2. The vehicle window opening and closing control device according to claim 1,
    wherein the controller detects a ripple generated in each of the currents passed through the first to fourth wirings, and determines an opening and closing positions of the first and second windows from the states of the ripples.

3. The vehicle window opening and closing control device according to claim 1,
    wherein, when the opening and closing operation of the second window is performed using the second main switch while the opening and closing operation of the second window is also performed using the sub-switch, and when the window opening and closing operations are performed in an identical direction using the second main switch and the sub-switch, the controller rotates the other-seat motor such that the second window is opened or closed in the direction.

4. The vehicle window opening and closing control device according to claims 1,
    wherein, when the opening and closing operation of the second window is performed using the second main switch while the opening and closing operation of the second window is also performed using the sub-switch, and when the window opening and closing operations are performed in opposite directions to each other using the second main switch and the sub-switch, the controller stops the other-seat motor.

5. The vehicle window opening and closing control device according to claim 1,
    wherein the sub-switch and the other-seat motor are provided in each seat.

6. The vehicle window opening and closing control device according to claim 2,
    wherein the sub-switch and the other-seat motor are provided in each seat.

7. The vehicle window opening and closing control device according to claim 3,
    wherein the sub-switch and the other-seat motor are provided in each seat.

8. The vehicle window opening and closing control device according to claim 4,
    wherein, when the manual opening operation of the second window is performed using the second main switch while the manual closing operation of the second window is performed using the sub-switch, or when the manual closing operation of the second window is performed using the main switch while the manual opening operation of the second window is performed using the sub-switch, the controller stops the other-seat motor while both the main switch and the sub-switch are operated, and the controller rotates the other-seat motor according to the operation of one of the switches when the operation of other switch is stopped.

9. The vehicle window opening and closing control device according to claim 8,
    wherein the sub-switch and the other-seat motor are provided in each seat.

10. The vehicle window opening and closing control device according to claim 4,
    wherein the sub-switch and the other-seat motor are provided in each seat.

11. The vehicle window opening and closing control device according to claim 4,
    wherein, when the automatic opening operation of the second window is performed using the second main switch while the manual closing operation of the second window is performed using the sub-switch, or when the automatic closing operation of the second window is performed using the second main switch while the manual opening operation of the second window is performed using the sub-switch, the controller determines that the catch is generated in the second window by the stop of the other-seat motor, and the controller stops automatic opening action or automatic closing action of the second window.

12. The vehicle window opening and closing control device according to claim 11,
    wherein the controller performs manual opening action or manual closing action of the second window according to the operation of the sub-switch after stopping the automatic opening action or the automatic closing action of the second window.

13. The vehicle window opening and closing control device according to claim 12,
    wherein the sub-switch and the other-seat motor are provided in each seat.

14. The vehicle window opening and closing control device according to claim 11,
    wherein the sub-switch and the other-seat motor are provided in each seat.

15. A vehicle window opening and closing control device comprising:
    a driver seat unit that is provided in a driver seat of a vehicle; and
    a sub-switch that is provided in a seat other than the driver seat,
    wherein the driver seat unit includes a main switch that operates opening and closing of a first window of the driver seat and a second window of the seat other than the driver seat, and a controller that controls a driver seat motor provided in the driver seat and an other-seat motor provided in the seat other than the driver seat to perform manual opening and closing and automatic opening and closing of the first and second windows based on the operation of the main switch,
    wherein the sub-switch is a switch that performs only the manual opening and closing of the second window using the other-seat motor,
    wherein the driver seat unit and the driver seat motor are connected to each other by first and second wirings, and a direction of a current passed through the driver seat motor and the first and second wirings switches according to the opening and closing operation of the first window using the main switch,
    wherein the driver seat unit and the other-seat motor of the seat other than the driver seat are connected to each other by third and fourth wirings through the sub-switch of the seat other than the driver seat, and a direction of a current passed through the other-seat motor, the third and fourth wirings, and the sub-switch switches according to the opening and closing operation of the second window using the main switch, and
    wherein the controller monitors the currents passed through the first to fourth wirings, and detects generation of catch in the first window and the second window based on states of the currents,
    wherein the sub-switch includes a first contact and a second contact,
    wherein the first contact is normally connected to the driver seat unit by the third wiring, and switches when the window closing operation is performed using the sub-switch,
    wherein the second contact is normally connected to the driver seat unit by the fourth wiring, and switches when the window opening operation is performed using the sub-switch, and
    wherein the switched first contact and the switched second contact are connected to a power supply by wirings other than the third and fourth wirings.

16. The vehicle window opening and closing control device according to claim 15,
    wherein the sub-switch and the other-seat motor are provided in each seat.

* * * * *